(12) United States Patent
Wakashiro et al.

(10) Patent No.: US 6,953,021 B2
(45) Date of Patent: Oct. 11, 2005

(54) CONTROLLER OF HYBRID VEHICLE

(75) Inventors: Teruo Wakashiro, Shioya-gun (JP);
Hideyuki Takahashi, Utsunomiya (JP);
Atsushi Matsubara, Utsunomiya (JP);
Tomoharu Kamo, Kawachi-gun (JP);
Toshiyuki Sato, Niiza (JP); Yasuo Nakamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/398,742

(22) PCT Filed: Oct. 19, 2001

(86) PCT No.: PCT/JP01/09184

§ 371 (c)(1),
(2), (4) Date: Apr. 15, 2003

(87) PCT Pub. No.: WO02/35074

PCT Pub. Date: May 2, 2002

(65) Prior Publication Data

US 2004/0026928 A1 Feb. 12, 2004

(51) Int. Cl.$^7$ .............................................. F02D 13/06
(52) U.S. Cl. ................. 123/321; 123/90.12; 123/90.15; 123/481; 123/198 F
(58) Field of Search .............................. 123/321, 90.12, 123/90.15, 325, 481, 198 DB, 198 F

(56) References Cited

U.S. PATENT DOCUMENTS

| | | | | |
|---|---|---|---|---|
| 5,725,064 A | * | 3/1998 | Ibaraki et al. ............... | 180/65.2 |
| 5,875,864 A | * | 3/1999 | Yano et al. .................. | 180/65.4 |
| 5,899,828 A | * | 5/1999 | Yamazaki et al. ............ | 477/4 |
| 6,178,934 B1 | | 1/2001 | Hirasawa et al. | |
| 6,334,498 B1 | * | 1/2002 | Morisawa et al. ........... | 180/65.2 |
| 6,369,531 B1 | * | 4/2002 | Oshima et al. .............. | 318/139 |
| 6,434,453 B1 | * | 8/2002 | Kuroda et al. ............... | 701/22 |

(Continued)

FOREIGN PATENT DOCUMENTS

| | | | | |
|---|---|---|---|---|
| EP | 1 010 865 A1 | | 6/2000 | |
| EP | 1232893 | * | 8/2002 | ........... F02D/41/36 |
| EP | 1232895 | * | 8/2002 | ........... F02D/41/36 |
| JP | 53-115408 | | 10/1978 | |
| JP | 54-69222 | | 5/1979 | |
| JP | 57-24432 | | 2/1982 | |
| JP | 62-17326 | | 1/1987 | |
| JP | 11-101140 | | 4/1999 | |
| JP | 11-350995 | | 12/1999 | |
| JP | 2000-154740 | | 6/2000 | |
| JP | 201972 | * | 7/2002 | ........... F02D/41/12 |
| JP | 41959 | * | 2/2003 | ........... F02D/41/04 |

OTHER PUBLICATIONS

Japanese Office Action for Japanese Patent Application No. JP 2001–155687, dated Oct. 11, 2002.

*Primary Examiner*—Hai Huynh
(74) *Attorney, Agent, or Firm*—Westerman, Hattori, Daniels and Adrian, LLP

(57) ABSTRACT

A control device for a hybrid vehicle having an engine and a motor as driving sources for the vehicle, and when decelerating, the control device stops the fuel supply to the engine and generates energy by regenerative braking. The engine is a cylinder pause-type engine which is capable of switching between the all-cylinder driving state in which all of cylinders are operating, and a cylinder paused driving state in which all of the cylinders are paused, and the control device of the hybrid vehicle comprises a cylinder pause state determination device for determining whether the engine is in the all cylinder driving state or in a cylinder paused driving state and a regeneration amount supplementing device for supplementing the regeneration energy by the motor by use of the increment of the regeneration energy obtained during the cylinder pausing operation than that obtained during all cylinder driving state.

9 Claims, 16 Drawing Sheets

U.S. PATENT DOCUMENTS

| | | | |
|---|---|---|---|
| 6,516,254 B1 * | 2/2003 | Wakashiro et al. | 701/22 |
| 6,616,570 B2 * | 9/2003 | Wakashiro et al. | 477/5 |
| 6,629,024 B2 * | 9/2003 | Tabata et al. | 701/22 |
| 6,636,788 B2 * | 10/2003 | Tamagawa et al. | 701/22 |
| 6,687,603 B2 * | 2/2004 | Wakashiro et al. | 701/110 |
| 2002/0112903 A1 * | 8/2002 | Wakashiro et al. | 180/65.2 |
| 2002/0115532 A1 * | 8/2002 | Wakashiro et al. | 477/111 |
| 2003/0102175 A1 * | 6/2003 | Wakashiro et al. | 180/65.4 |
| 2003/0106728 A1 * | 6/2003 | Kitajima et al. | 180/65.2 |
| 2004/0107926 A1 * | 6/2004 | Kataoka et al. | 123/90.15 |

* cited by examiner

CONTROLLER OF HYBRID VEHICLE

BACKGROUND OF THE INVENTION

1. Field of the Invention

The present invention relates to a control system for a hybrid vehicle, and in particular, relates to a control system for a hybrid vehicle capable of improving the fuel consumption efficiency.

2. Description of the Related Art

Conventionally, hybrid vehicles, which carry motors as power sources for driving in addition to engines, are known. Hybrid vehicles are classified into serial hybrid vehicles and parallel hybrid vehicles. In parallel hybrid vehicles, the motor connected to the engine assists the rotation of the drive shaft of the engine while charging a power storage unit using the motor as a generator.

In parallel hybrid vehicles, the motor assists the engine at the time of acceleration and a power storage unit such as a battery is charged by deceleration regeneration during deceleration, in order to maintain sufficient electrical energy in the power storage unit such as a batteries (hereinafter, called the remaining charge, or the "state of charge") to meet the driver's demands. Specifically, since the engine and the motor are connected in series in the parallel hybrid vehicle, the driving system of the parallel hybrid vehicle can be constituted by a simple and light weight structure and this driving system is applicable to a variety of types of vehicles.

There are several types of the parallel hybrid vehicles, one of which is a type that is provided with a clutch between the engine and the motor in order to avoid the influence of the engine friction (the engine brake) during deceleration regeneration (see, for example, Japanese Patent application, First Publication No. 2000-97068), and another type is one wherein the engine, the motor, and the transmission are connected in series in order to provide an extremely simple driving system.

However, the driving system having a clutch between the engine and the motor has a structure that has a problem in that the applicability of this driving system to a variety of vehicles is restricted because of the complicated structure of this system and because the transmission efficiency of the power transmission system of this driving system is degraded even when the vehicle is running.

The driving system in which the engine, the motor, and the transmission are connected in series has a problem in that the amount of regeneration energy is reduced because of the aforementioned engine friction so that the assist amount by the motor is restricted.

In the latter driving system, in order to reduce engine friction during deceleration, the amount of regeneration may be increased by reducing the pumping loss drastically through the use of an electronically controlled throttle mechanism for fully opening the intake and the exhaust valves during deceleration. However, when the intake and the exhaust valves are fully opened as described above, introduction of fresh air into the exhaust system during deceleration causes lowering of the temperatures of the catalyst and the A/F (air fuel ratio) sensor, which results in causing a problem in that the optimum control of the exhaust gas will be degraded.

SUMMARY OF THE INVENTION

An object of the present invention is to provide a control system for a hybrid vehicle, capable of sufficiently ensuring the regeneration energy and capable of drastically improving the fuel consumption efficiency without deteriorating the optimum control of the exhaust gas.

A first aspect of the present invention provides a control device for a hybrid vehicle having an engine (for example, the engine E in the embodiment) and a motor (for example, the motor M in the embodiment) as driving sources of the vehicle, the motor stops assisting the output of the engine when the vehicle is decelerating, and said motor generates energy by regeneration braking depending upon the deceleration state; the device comprising: an engine which is a cylinder pause-type engine and which is capable of switching between the all-cylinder driving state, in which all of the cylinders are operating, and a cylinder paused driving state, in which at least one cylinder is paused; a cylinder pause state determination device (for example, step S009 shown in FIG. 2 in the embodiment) for determining whether the engine is in the all cylinder driving state or in a cylinder paused driving state; and a regeneration amount supplementing device (for example, step S311 shown in FIG. 9 in the embodiment) for supplementing the regenerative energy by the motor by use of the increment of deceleration regeneration energy obtained during the cylinder paused driving than deceleration energy obtained during the all-cylinder driving when the cylinder paused state is detected by said cylinder pause state detecting device and the engine is driven in the cylinder paused driving state.

According to the above constitution, since execution of the cylinder paused driving makes it possible to reduce the fuel consumption and to improve the regeneration efficiency of the motor by recovering the deceleration energy loss due to the pumping loss and the friction loss of the valve gear system, an effect is obtained in that the cylinder pausing operation makes it possible not only to improve the fuel consumption efficiency but also to increase the assisting frequency or the assisting amount by the motor to the amount of regeneration energy accumulated while executing the cylinder pausing operation.

According to a second aspect of the present invention, in the above control device for a hybrid vehicle, the cylinder pause state determination device prohibits cylinder paused driving (for example, step S156 shown in FIG. 8) when the negative pressure in the brake master power cylinder (for example, the negative pressure MPGA in the brake master power cylinder in the embodiment), detected by the negative pressure detecting device (for example, the negative pressure sensor S8), is close to the atmospheric pressure (for example, step S154 in the embodiment) and exceeds a threshold value (for example, the threshold value MPFCMG in the embodiment).

By the above constitution, since it is possible to preferentially maintain the pressure in the brake master power cylinder when the negative pressure is close to atmospheric pressure exceeding a threshold value by prohibiting the cylinder pausing operation, the cylinder pausing operation does not exert any deleterious influence on the brake system.

According to the third aspect of the present invention, the above control device for a hybrid vehicle controls the cylinder pausing operation so as to be executed while both of an air intake valve (for example, the air intake valve IV in the embodiment) and an exhaust valve of each cylinder (for example, the exhaust valve EV in the embodiment) are closed.

Accordingly, since it is possible to reduce the pumping loss and the friction loss during the cylinder pausing operation and to block inflow of fresh air into the exhaust system, an effect is obtained in which the fuel consumption efficiency can be improved extensively while preventing the temperature drop of the catalytic device and while executing appropriate control of the exhaust gas.

Furthermore, by constituting as described above, when the cylinder pause determination device has detected to execute the cylinder pausing operation, and while executing the cylinder pausing operation, if the regeneration by the motor is not necessary (for example, step S059 in FIG. 7 in the embodiments), it is possible to move the vehicle only by the motor while executing the cylinder pausing operation for responding to a request for acceleration by constituting to move the vehicle only by the motor (for example, step S508 in the embodiment) depending upon the driving state of the vehicle.

According to a fourth aspect of the present invention, in the above control device for a hybrid vehicle, the cylinder pausing operation by the cylinder pause state determination device is to enter all cylinders into the cylinder pausing operation.

Accordingly, since the cylinder pausing operation makes it possible to improve the regeneration efficiency by the motor by minimizing the pumping loss of the engine and the friction loss, one effect of the present invention can remarkably increase fuel consumption efficiency.

According to a fifth aspect of the present invention, in the above-described control device for a hybrid vehicle, the number of cylinders to be controlled in the cylinder pausing operation is more than one half of the total number of cylinders.

Accordingly, since it is possible to maintain at least a minimum amount of driving energy when the cylinder pause mechanisms are detected to be in an anomalous state, the vehicle safety is further increased.

According to a sixth aspect of the present invention, in the above control device for a hybrid vehicle, the cylinder pausing operation is performed by closing both air intake valve and the exhaust valve of each cylinder by each hydraulic-type variable valve timing mechanism, and the oil pressure control device (for example, the spool valve 71 in the embodiments) for supplying the oil pressure to said variable valve timing mechanism is disposed at a position which is the outermost position from the cylinder which does not execute the cylinder pausing operation.

According to the above aspect, since it is possible to dispose the cylinders provided with respective hydraulic-type variable valve timing mechanisms at the position where good oil pressure response can be obtained, an effect is obtained in which the response speed of the hydraulic-type variable valve timing mechanism becomes high because the operational delay of these mechanisms can be minimized.

According to a seventh aspect of the present invention, in the above control device for a hybrid vehicle, said cylinder pausing operation is executed either by the air intake valve closure operation or by the exhaust valve closure operation.

According to the above aspect, the present aspect makes it possible to simplify the structure of the cylinder system and to reduce the lowering of the combustion efficiency and the exhaust gas treatment.

According to the eighth aspect of the present invention, the above control device for a hybrid vehicle executes the fuel supply stop to the corresponding cylinder when anomaly is detected for said oil control device or said variable valve timing mechanism.

According to the above aspect, it is possible to improve the fuel consumption efficiency by stopping the fuel supply to anomalous cylinders and to protect the catalytic device by preventing fuel combustion downstream of the combustion chamber when the cylinder has recovered from the anomalous state.

BRIEF DESCRIPTION OF THE DRAWINGS

FIG. 14A is a cross-sectional diagram of the main portion of the variable valve timing mechanism while all cylinders are in the driving state, and FIG. 14B is a cross-sectional diagram of the main portion of the variable valve timing mechanism while all cylinders are in the paused driving state.

DETAILED DESCRIPTION OF THE INVENTION

Hereinafter, a first embodiment of the present invention is described with reference to the attached drawings.

Figure 1:
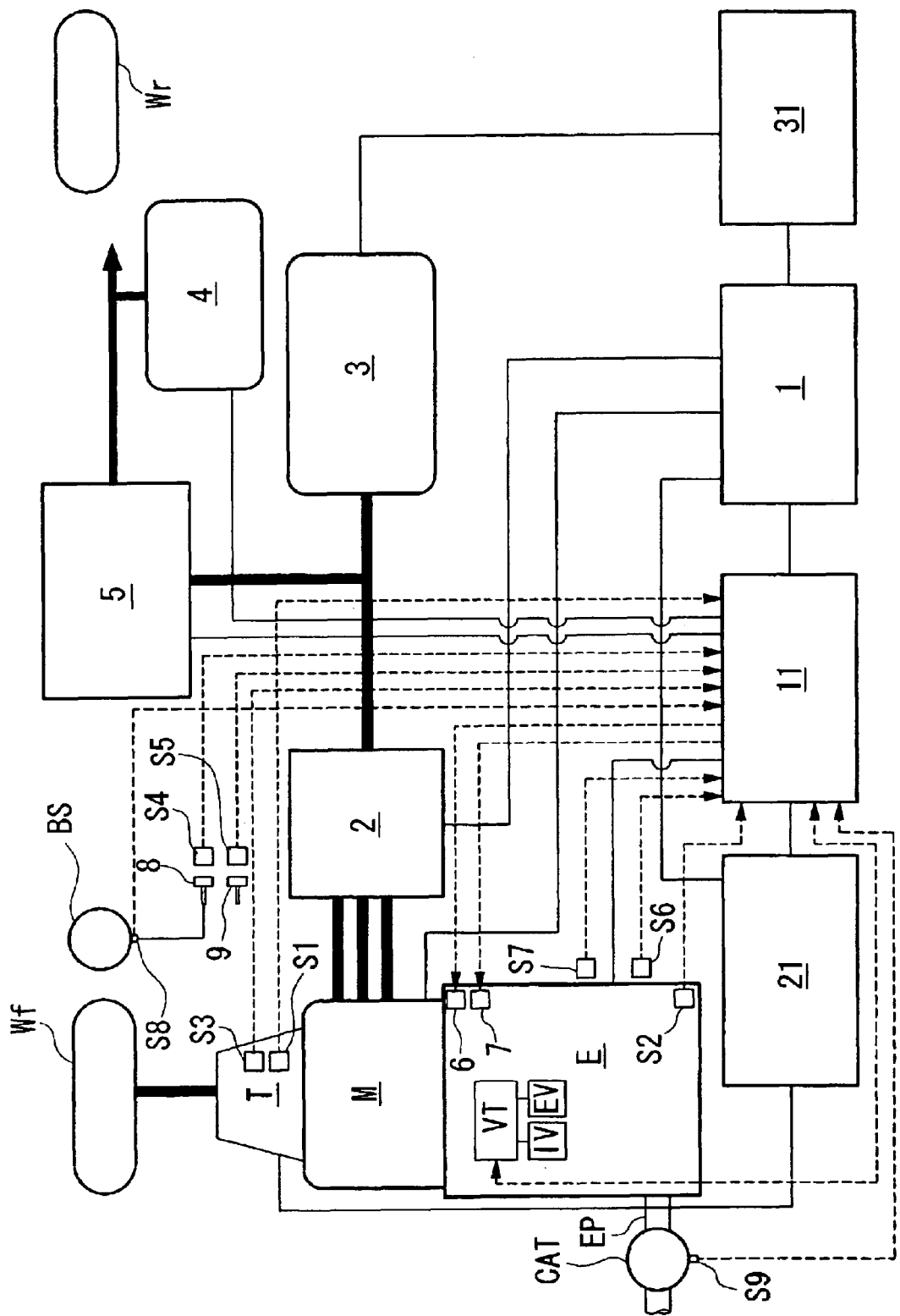
FIG. 1 is a schematic diagram showing the overall structure of the hybrid vehicle.

FIG. 1 is a schematic diagram showing the overall structure of the hybrid vehicle. As shown in FIG. 1, the driving system is constituted by connecting an engine E, a motor M, and a transmission T in series. Thus, a clutch is not provided between the engine E and the motor M. The driving force of both of the engine E and the motor M is transmitted to front wheels Wf and Wf as driving wheels through a transmission T such as an automatic transmission or a manual transmission. In contrast, when the driving force is transmitted from the front wheels during deceleration of the hybrid vehicle, the motor M operates as a generator which generates regenerative braking energy and the kinetic energy of the vehicle is recovered as electric energy. Note that the symbol Wr denotes a rear wheel.

The driving of the motor M and the regenerative operation by the motor M are conducted by a power drive unit 2 according to control commands from a motor ECU 1. A battery 3 for sending and receiving electric energy to and from the motor M is connected to the power drive unit 2, and the battery 3 is constituted by, for example, a plurality of modules connected in series, wherein each module is constituted by a plurality of cells connected in series. Hybrid vehicles include a 12 V auxiliary battery 4 for driving various accessories. The auxiliary battery 4 is connected to the battery 3 via a downverter 5. The downverter 5, controlled by an engine electronic control unit FIECU 11, reduces the voltage from the capacitor 3 and charges the auxiliary battery 4.

The FIECU 11 controls, in addition to the motor ECU 1 and the above-described downverter 5, a fuel supply amount controller 6 for controlling the amount of fuel supplied to the engine E, a starter motor 7, an ignition timing etc. Therefore, the FIECU 11 receives a signal from a speed sensor $S_1$ for detecting the vehicle speed V based on the rotation number of the driving shaft of the transmission, a signal from an engine rotational speed sensor (rotational speed detecting device) $S_2$ for detecting the engine rotational speed NE, a signal from a shift position sensor $S_3$ for detecting the shift position of the transmission T, a signal from a brake switch $S_4$ for detecting the operation of a brake pedal 8, a signal from a clutch switch $S_5$ for detecting the operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 21 denotes an electronic control unit CVTECU for controlling a CVT vehicle, and 31 denotes a battery ECU for calculating the remaining charge of the battery (SOC: state of charge of the battery).

The symbol BS represents a booster connected with a brake pedal 8, and a negative pressure sensor $S_8$ is provided with this booster Bs for detecting the negative pressure in a brake master power cylinder. Note that it is possible to employ the aforementioned intake passage pressure sensor $S_7$ in place of this negative pressure sensor $S_8$. This negative pressure sensor $S_8$ is connected to the FIECU 11. A catalyst device CAT is provided in the exhaust passage EP of the engine E and the catalyst device CAT is provided with a temperature sensor $S_9$, which is also connected to the engine ECU 11.

Here, the aforementioned engine E is a cylinder pause-type engine capable of switching the driving mode between all-cylinder operation and the all-cylinder pausing operation. As is schematically shown in FIG. 1, an intake valve IV and an exhaust valve EV of each cylinder of the engine E are constituted so as to be able to suspend driving through the variable valve timing mechanism VT. The variable valve timing mechanism VT is connected to the engine ECU 11.

The practical operations will be described in detail below with reference to FIGS. 13 and 14.

Figure 13:
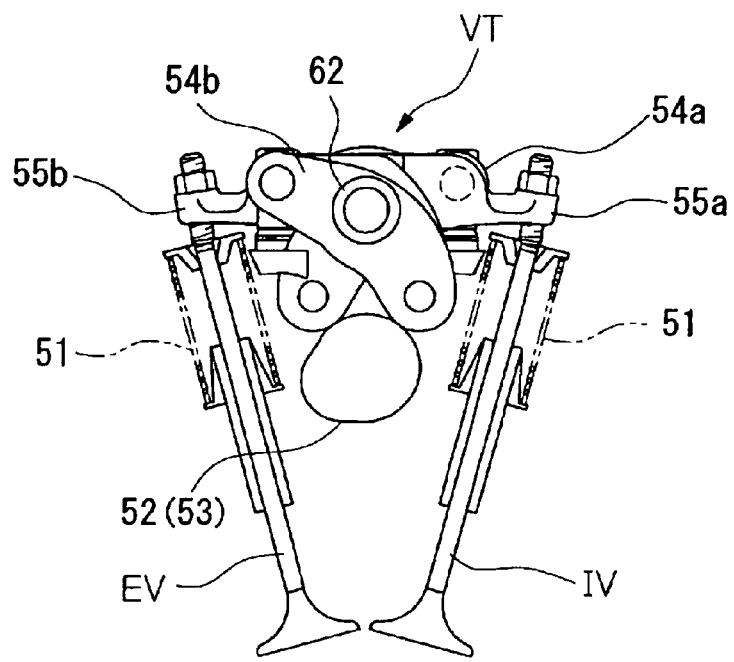
FIG. 13 shows a plan view showing a variable valve timing mechanism according to the first embodiment of the present invention.

FIG. 13 shows an example in which the variable valve timing mechanism VT is applied to the all-cylinder pausing operation to a SOHC-type engine. The intake valve IV and the exhaust valve EV are provided with each cylinder (not shown), and the intake valve IV and the exhaust valve EV are biased by valve springs 51 and 51 so as to close the intake and exhaust ports (not shown). The reference numeral 52 denotes a lift cam mounted to the cam shaft 53, and the lift cam 52 is connected to intake valve cam lifting rocker arms 54a and 54b for respectively lifting the intake valve side cam and the exhaust valve side cam. These rocker arms 54a and 54b are rotatably supported through a rocker arm shaft 62.

Furthermore, the valve drive rocker arms 55a and 55b for operating the valves are rotatably supported at the rocker arm shaft 62 adjacent to the rocker arms 54a and 54b for the lift cam 52. The distal ends of valve operating rocker arms 55a and 55b are constituted to push the respective top ends of the intake valve IV and the exhaust valve EV for opening these valves. The proximal ends (opposite end to the valve pushing ends) of the valve operating rocker arms 55a and 55b are configured so as to be able to slidably contact with a completely round cam 531 attached to the cam shaft 53.

Figure 14A:
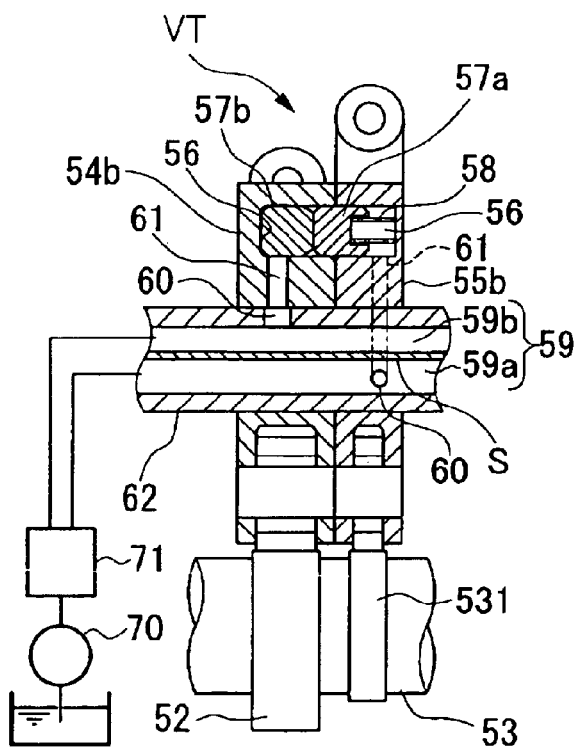
FIGS. 14A and 14B show the variable valve timing mechanism according to the first embodiment of the present invention.
Figure 14B:
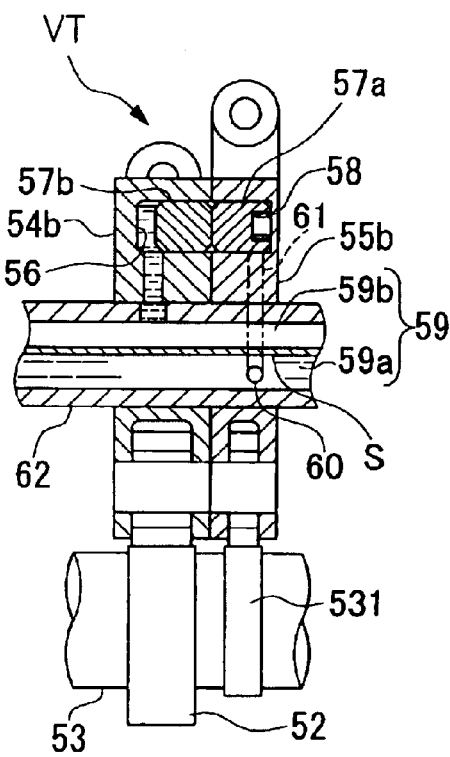

FIGS. 14A and 14B show constitution of the cam lifting rocker arm 54b and the valve operating rocker arm 55a, taking the exhaust valve side as an example.

As shown in FIGS. 14A and 14B, adjacent to the cam lifting rocker arm 54b and the valve operating rocker arm 55b, a hydraulic chamber 56 is rotatably supported extending over the cam lifting rocker arm 54b and the valve operating rocker arm 55b. In the hydraulic chamber 56, a piston 57b, and a release pin 57b are slidably mounted, and a pin 57a is biased to the cam lifting rocker arm 54b through a pin spring 58. In the rocker arm shaft 62, oil passages 59 (59a and 59b) are defined through a partition portion S. The oil passage 59b is communicated with the hydraulic chamber 56 on the side of the release pin 57b through the opening 60 of the oil passage 59b and the communication passage 61 of the cam lifting rocker arm 54b, and the oil passage 59a is communicated with the hydraulic chamber 56 so as to be connectable to the drain passage (not shown) on the side of the pin 57a through the opening 60 of the oil passage 59a and through the communication passage 61 of the valve operating rocker arm 55b.

As shown in FIG. 14A, when an oil pressure does not operate through the oil passage 59b, the pin 57a moves to a position riding over the cam lifting rocker arm 54b and the valve operating rocker arm 55b. In contrast, as shown in FIG. 14B, when the oil pressure operates through the oil passage 59b, the pin 57a together with the release pin 57b slide to the valve operating rocker arm 55b opposing to the pin spring 58, the boundary portion of the pin 57a with the release pin 57b coincides with the boundary portion between the cam lifting rocker arm 54b and the valve operating rocker arm 55b, so that the connection between the cam lifting rocker arm 54b and the valve operating rocker arm 54b is disconnected. Note that the intake valve side has the same structure. The oil passage 59a and 59b are connected to the oil pump 70 through a spool valve 71 as the hydraulic control device for maintaining the oil pressure of the variable valve timing mechanism VT.

Accordingly, when driving conditions by the all-cylinder pausing operation are satisfied, the spool valve 71 is actuated by the signal from the engine ECU 11, the hydraulic pressure operates to the hydraulic chamber 56 from the oil passage 59b at both of the intake side and exhaust side through the oil pump 70. Then, the pins 57a and 57a and the release pins 57b and 57b, which are employed for uniting the cam lifting rocker arms 54a and 54b and the valve operating rocker arms 55a and 55b are displaced towards the valve operating rocker arm, and the connection between the cam lifting rocker arms 54a and 54b and the valve operating rocker arm 55a and 55b is disconnected.

That is, although the cam lifting rocker arms 54a and 54b are driven by rotation of the lift cam 52, the rotation of the lift cam 52 cannot be transmitted to the valve operating rocker arms 55a and 55b when the connection between the valve operating rocker arms 55a and 55b and the cam lifting rocker arms 54a and 54 by the pins 57a and the release pins 57b are released. Since the valve operating rocker arms 55a and 55b are not driven, the valve IV and the valve EV are maintained in the closed state, thereby the all-cylinder paused driving can be realized.

[Main Processing of MA Start/Basic Mode]

The main processing for the MA start/basic mode is explained with reference to FIGS. 2 to 4. This processing suspends operations of both the motor M and the starter motor 7. This processing is carried out for switching an MA (motor) start mode" for starting by the motor M, a "WAIT mode" to enable starting by the starter motor 7, an "MA basic mode" for setting the driving mode of the motor M depending upon the state of the engine, and an "MA (motor) F/S (fail safe) processing mode" in the case of a failure of the motor.

In step S001, the start execution flag F_STCON by the starter is determined. This flag is set to "1" when the starter clutch is "ON". When it is determined in step S001 that the start by the starter is executed (F_STCON=1, STC signal ON), the flow proceeds to step S003. When it is determined in step S001 that the start by the starter is not executed (F_STCON=0, STC signal NO), the flow proceeds to step S002.

In step S002, the starter switch ON start execution flag F_MGST is determined. When the starter switch is turned "ON", this flag is set to "1, ". When the starter switch is turned "ON" (F_MGST=1), the flow proceeds to step S009. When the starter switch is not turned "ON" (F_MGST=0), the flow proceeds to step S003.

In step S003, a MT/CVT flag F_AT is determined. When it is determined in step S003 that the vehicle is a MT vehicle (F_AT=0, NO), the flow proceeds to step S033. When it is determined in step S003 that the vehicle is a CVT vehicle (F_AT=1, YES), the flow proceeds to step S004.

In step S033, a clutch interlock switch flag F_SWCLINLK is determined. When it is determined that the flag is interlocked (F_SWCLINLK=1, YES), the flow proceeds to step S034. If not interlocked (F_SWLINLK=0, NO), the flow proceeds to step S005.

In step S034, a clutch switch ON flag F_CLSW is determined. When it is determined in step S034 that the clutch switch is disengaged (F_CLSW=1), the flow proceeds to step S005. When it is determined in step S034 that the clutch switch is engaged (F_CLSW=0), the flow proceeds to step S021.

In step S004, the CVT in-gear determination flag F_ATNP is determined. When it is determined in step S004 that the vehicle is in-gear (F_ATNP=0), the flow proceeds to step S021. When it is determined in step S004 that the vehicle is in the "N or P position" (F_ATNP=1), the flow proceeds to step S005.

In step S021, it is determined whether the engine rotation speed NE is equal to or less than the motor start rotation number #NESTMA (approximately 800 to 900 rpm having hysteresis) (NE≦#NESTMA). When it is determined in step S022 that the engine rotation speed NE satisfies the above condition (YES), a motor communication anomalous time starter start transition delay timer TSTB1 is set to a predetermined value of #TSTB1, and in step S023, a motor start time starter switch continuation time starter start shift delay timer is set to a predetermined value of #TSTB2, and the flow proceeds to step S024.

In step S024, the motor is stopped for providing the "WAIT mode" and the control is completed. At this time, the starter is also stopped (F_STCON←0, STC signal OFF), the compulsory start can be executed from the state where both engine and starter have been stopped.

Figure 2:
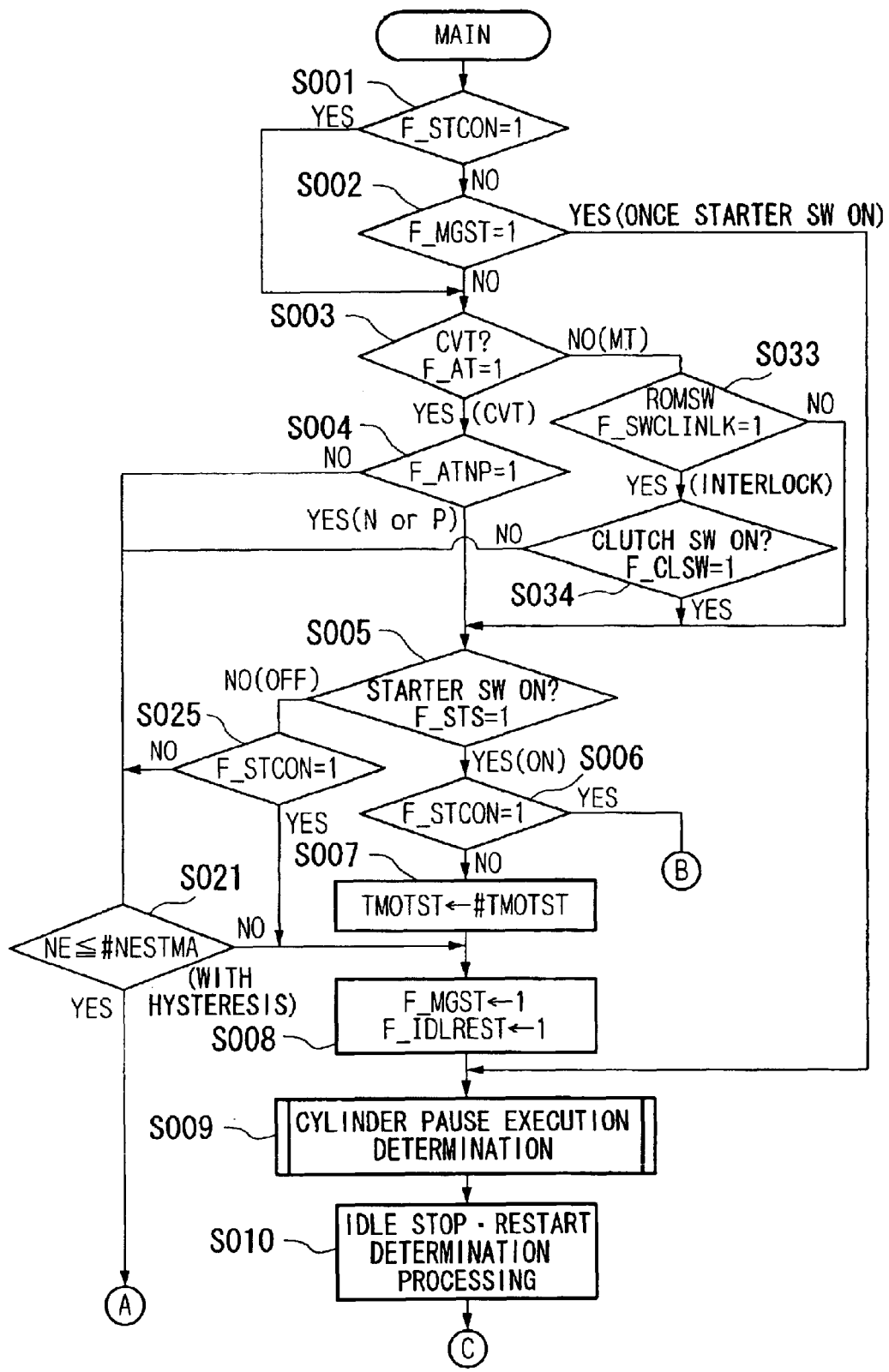
FIG. 2 is a flowchart showing a main processing of MA start/standard mode according to the first embodiment of the present invention.

When it is determined in step S021 shown in FIG. 2 that the engine rotation speed NE is greater than the motor start rotation number #NESTMA (NE>#NESTMA), the flow proceeds to step S008.

In step S005, the starter switch determination flag F_STS is determined. This flag determines whether the starter switch is ON. When it is determined in step S005 that the starter switch is ON (F_STS=1), the flow proceeds to step S006, wherein the start execution flag by the starter F_STCON is determined. When, in contrast, it is determined in step S005 that the starter switch is OFF (F_STS=0), the flow proceeds to step S026, wherein the start execution flag by the starter F_STCON is determined.

Figure 4:
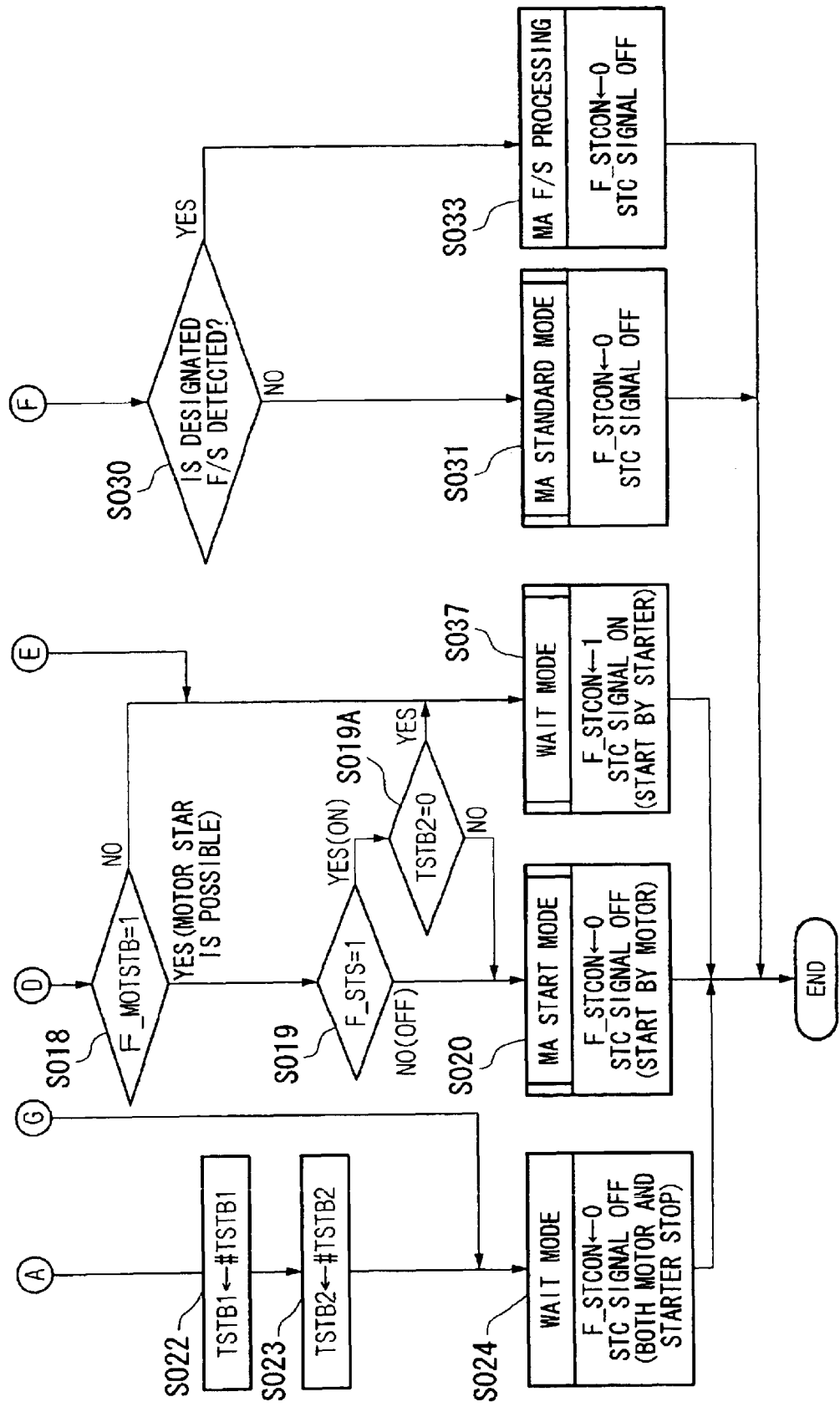
FIG. 4 is a flowchart showing a main processing of MA start/standard mode according to the first embodiment of the present invention.

When it is determined in Step S006 that the start by the starter is executed ((F_STS=1, STC signal ON), the flow proceeds to step S037 shown in FIG. 4. If it is determined in step S006 that the start by the starter is not executed ((F_STS=0, STC signal OFF), the flow proceeds to step S007.

When it is determined in step S025 shown in FIG. 2 that the start by the starter is executed ((F_STCON=1, STC signal ON), the flow proceeds to step S008. It is determined that that the start by the starter is not executed ((F_STCON=0, STC signal OFF), the flow proceeds to step S021.

In step S007, a start mode maintenance timer TMOTST at the time of engine stop immediately after the starter switch has been turned OFF is set to a predetermined value #TMOTST and the flow proceeds to step S008. In step S008, a starter switch ON start execution flag F_MGST is set to "1", and a restart execution flag by opening the throttle F_IDLREST is set to "1".

Next, in step S009, a cylinder pause execution determination is executed, and in step S010, a determination processing is executed for the engine (IDLE) stop restart determination and the flow proceeds to step S011. The cylinder pause execution determination is processing for determining whether the conditions to pause the cylinder is satisfied. The engine stop restart determination is processing for determining whether the engine stop is executed under a certain conditions when the vehicle is being stopped and for determining the restart of the engine, which has been stopped when a certain conditions are satisfied. Practically, it is determined whether the engine stop control is executed by determining whether an engine stop control flag F_FCM is "1", and it is determined whether the engine stop control is not executed by determining whether an engine stop control flag F_FCM is "0".

In step S011, the engine stop control execution flag F_FCMG is determined depending on the determination in step S010. When it is determined in step S011 that the engine stop control is executed (F_FCMG=1), the flow proceeds to S026. When it is determined in step S011 that the engine stop control is not executed (F_FCMG=0), the flow proceeds to S012.

In step S012, MA (motor) start mode determination is executed. In this MA (motor) start mode determination, it is determined whether the start is executed by the motor or the starter motor by determining respective flags of an MA start improper mode determination flag F_STDISMA and a motor start mode determination flag F_STMODMA.

It is determined that the motor start is improper by determining the aforementioned MA start improper mode determination flag F_STDISMA and the motor start mode is determined by determining the motor start mode determination flag F_STMODMA.

In step S013, the aforementioned MA start improper mode determination flag F_STDISMA is determined. When it is determined in step S013 that the MA start improper mode determination flag F_STDISMA=1 (YES), the flow proceeds to step S022 shown in FIG. 4. If it is determined in step S013 that the MA start improper mode determination flag F_STDISMA=0 (NO), the flow proceeds to step S014.

In step S014, the motor start mode determination flag F_STMODMA is determined. When it is determined in step S014 that the motor start mode determination flag F_STMODMA=1 (YES), the flow proceeds to step S015. If it is determined in step S014 that the motor start mode determination flag F_STMODMA=0 (YES), the flow proceeds to step S028.

In step S015, it is determined whether the designated F/S (fail safe) is already detected. When it is determined in step S015 that the designated F/S (fail safe) is already detected (YES), that is, when it is detected that the motor is an anomalousstate, the flow proceeds to step S037 shown in FIG. 4. If it is determined in step S015 that no designated F/S is detected (NO), that is, the motor is in a normal state, the flow proceeds to step S016.

In step S016, the start by the starter execution flag F_STCON is determined. when it is determined that the start by the starter is executed (F_STCON=1, the STC signal is ON), the flow proceeds to step S037 shown in FIG. 4. If the start by the starter is not executed (F_STCON=0, STC signal OFF), the flow proceeds to step S017.

In step S017, it is determined whether the engine water temperature TW is lower than the upper limit temperature #TWST (having hysteresis) for starting by the starter. This determination is executed in order to reduce the higher load applied to the motor when the engine water temperature TW is too low. When it is determined in step S017 that the engine water temperature is reasonably high (TW>#TWST) so as to be able to start by the motor without applying a load to the battery, the flow proceeds to step S18 shown in FIG. 4. If it determined in step S017 that the start by the motor is not appropriate and the start by the starter is desirable because the low engine water temperature is low (TW≦#TWST), the flow proceeds to step S037 shown in FIG. 4, and the motor is converted to the "WAIT" state, and the control operation is completed preparing the start by the starter (F_STCON←1, STC signal ON).

In step S018 of FIG. 4, it is determined whether the engine start by the motor M is possible based on the aforementioned communication information from the motor ECU 1 by determining whether the motor start available flag F_MOTSTB is "1". When it is determined in step S018 that the motor is not in the standby state (F_MOTSTB=0, NO), the flow proceeds to step S037. When it is determined in step S018 that the motor is in the standby state (F_MOTSTB=1, YES), the flow proceeds to step S019.

In step S019, it is determined whether the starter switch determination flag F_STS is "1". When it is determined in step S019 that the starter switch is ON (YES), it is determined in step S019A whether the motor start time starter switch continuation period starter start transition delay timer TSTB is "0".

When it is determined in step S019A that the timer is "0" (YES), the flow proceeds to step S037, considering that a sufficient transition time has elapsed. When it is determined in step S019A that the timer is not "0" (NO), and it is considered that the transition time is not sufficient, the flow proceeds to step S020.

When it determined in step S019 that the starter switch is OFF (flag F_STS=0), the flow proceeds to step S020, wherein the control converts to the "MA (motor) start mode", wherein the start is executed by the motor M (F_STCON←0, STC signal OFF), and the control is completed.

Figure 3:
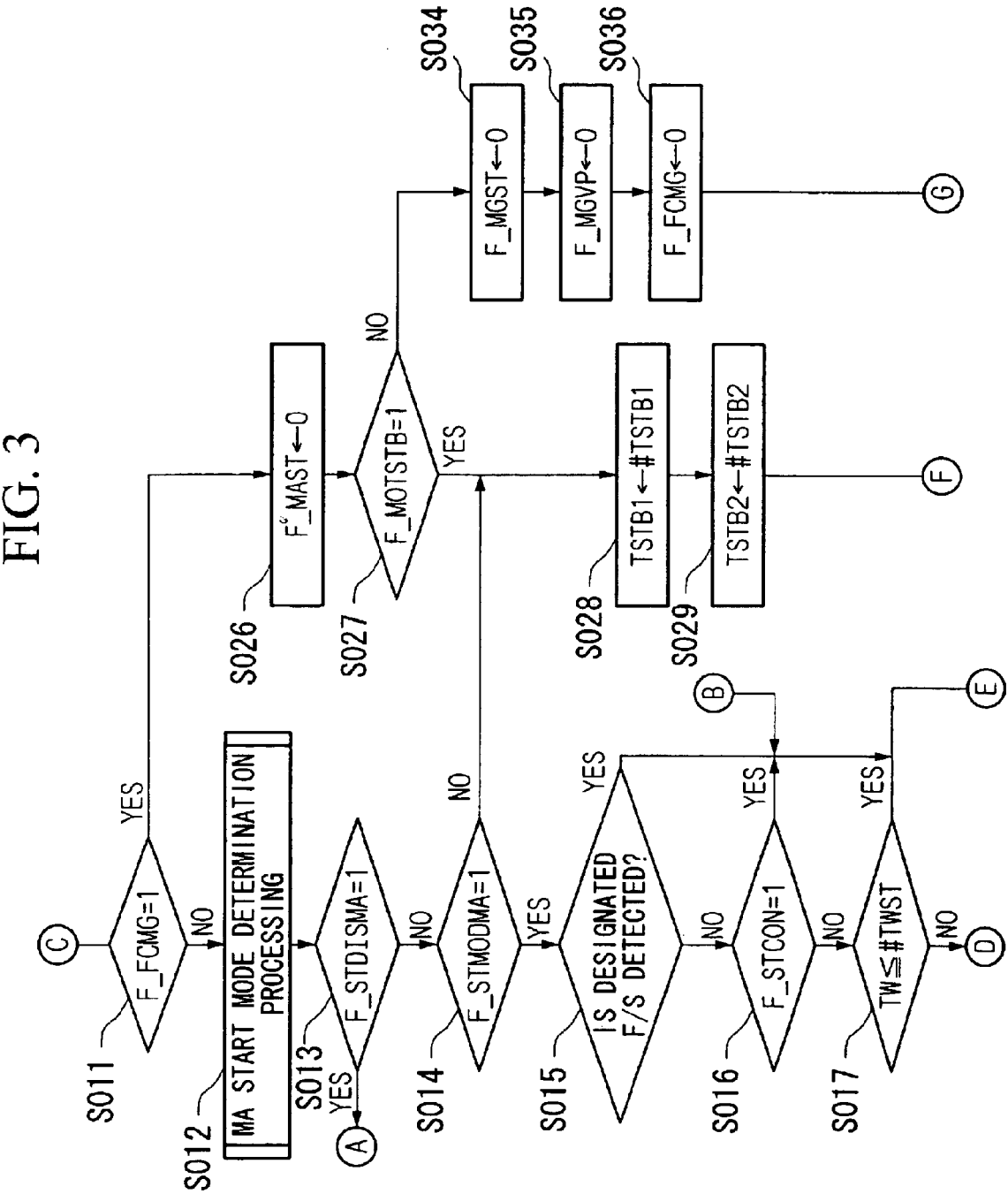
FIG. 3 is a flowchart showing a main processing of MA start/standard mode according to the first embodiment of the present invention.

When it is determined in step S011 shown in FIG. 3 that the engine stop control is executing and that F_FCMG=1 (YES), which means that the vehicle is decelerating, the flow proceeds to step S026 wherein the motor assist determination flag F_MAST is set to "0" and further proceeds to step S027. In step S027, it is determined whether the motor start available flag F_MOTSTB is "1".

When the determination in step S027 indicates that the motor is not in the standby state (F_MOTSTB=0, NO), then, in steps S034 to step S036, the starter switch ON start execution flag F_MGST, the running execution history flag F_MGVP, and the engine stop execution control flag F_FCMG are set to "0", respectively, and the flow further proceeds to step S024.

When it is determined in step 027 that the motor is in the standby state (F_MOTSTB=1, YES), the flow proceeds to step S028. In step S028, the motor communication anomalous time starter start transition delay timer TSTB2 is set to a predetermined value #TSTB2, and the flow proceeds to step S030.

In step S030, it is determined whether the designated F/S (fail safe) is already detected. When it is determined that the designated F/S (fail safe) is detected, that is, when the motor is in an anomalous state, the flow proceeds to step S033, wherein the operation is converted to the "MA (motor) F/S (fail safe) processing mode" (F_STCON←0, STC signal OFF) and the control is completed.

If the determination in step S030 indicates that the designated F/S is not detected (NO), that is, the motor is in a normal state, the flow proceeds to step S031, wherein the operation is converted to the "MA (motor) basic mode" (F_STCON←0, STC signal OFF) and the control is completed.

[MA (Motor) Base Mode]

Next, the MA (motor) basic mode shown in step S031 of FIG. 4 will be explained based on the flowchart shown in FIGS. 5 to 7.

The MA (motor) basic mode includes an "idle mode", an "idle stop mode", a "deceleration mode", a "cruise mode", and an "acceleration mode". In the idle mode, the fuel supply is restarted after the fuel has been cut and the engine is maintained in the idle state. In the idle stop mode, the engine is stopped under certain conditions, for example, when the vehicle is stopped. In the deceleration mode, regenerative braking is conducted by the motor M, and in the acceleration mode, the motor assists the driving of the vehicle by the engine, or the vehicle is driven by the motor, and in the "cruise mode", the vehicle is driven by the engine while the motor M is stopped.

In step S051, it is determined whether the MT/CVT determination flag is "1". When the determination indicates that the vehicle is a MT vehicle (NO), the flow proceeds to step S052. If the determination in step S051 indicates that the vehicle is a CVT vehicle (YES), the flow proceeds to step S060, wherein it is determined whether the CVT in-gear determination flag F_ATNP is "1". When the determination in step S060 indicates that the CVT vehicle is in-gear (NO), the flow proceeds to step S060A.

In step S060A, it is determined whether the vehicle is in the switch back state (in the shift lever state) by determining based on the state of the switch back flag F_VSWB. When it is determined that the vehicle is in the switch back state (YES), the flow proceeds to step S085, wherein the vehicle is converted to the "idle mode" and the control is completed. In the "idle mode", the engine E is maintained in operation. If the determination in step S060A indicates that the vehicle is in the switch back state (NO), the flow proceeds to step S053A.

When it is determined in step S060 that the gear is in the N or P positions (YES), the flow proceeds to step S083, wherein it is determined whether the engine stop control execution flag F_FCMG is "1". If the determination in step S083 is "NO", the flow proceeds to the "idle mode" in step S085 and the control is completed. When the determination in step S083 is "YES", the flow proceeds to step S084, wherein the operation is converted to the "idle stop mode" and the control is completed. In the "idle stop mode", the engine E is stopped under certain circumstances such as at the time of vehicle stop.

In step S052, it is determined whether the neutral position determination flag F_NSW is "1". When the determination in step S052 is "YES", that is, the gear is in the neutral position, the flow proceeds to step S083 shown in FIG. 7. If the result in step S052 is "NO", that is, the gear is in the neutral position, the flow proceeds to step S053, wherein it is determined whether a clutch connection determination flag F_CLSW is "1". When the result is "YES" indicating it is determined that the clutch is in the "disconnected" state, the flow proceeds to step S014. When the determination in step S053 is "NO", showing that the clutch is in the "connected" state, and the flow proceeds to step S053A.

In step S053A, it is determined whether the remaining battery charge QBAT is higher than a low speed start determination remaining battery charge QBATJAM. When the determination is YES, that is, the remaining battery charge QBAT is higher than the low speed start determination remaining battery charge QBATJAM, the flow proceeds to step S054. If the determination in step S053A is NO, that is, the remaining battery charge QBAT is lower than the low speed start determination remaining battery charge QBATJAM, the flow proceeds to step S053B.

In step S053B, it is determined whether the low speed start determination flag F_JAMST is "1". This low speed start determination flag F_JAMST is the flag which is determined to be "1" when the vehicle travels at a very low speed without accelerating. When the determination in step S053B is YES, that is, the vehicle is traveling at a very low speed, the flow proceeds to step S083 shown in FIG. 7. If the determination in step S053B is NO, that is, the vehicle is not traveling very slowly, the flow proceeds to step S54. That is, when the remaining battery charge is low, and the vehicle speed is also low, it is determined that the driver does not intend to accelerate the vehicle, and that the vehicle should be operated in the idle mode or the engine stop mode in order to improve the fuel consumption efficiency.

In step S054, it is determined whether the IDLE determination flag F_THIALMG is "1". When the determination is NO, that is, when the throttle is totally closed, the flow proceeds to step S061. If the determination in step S054 is YES, that is, the throttle is not totally closed, the flow proceeds to step S054A, wherein the engine rotation speed increment flag F_NERGNUP for judgement at the time of half-engaged clutch is set to "0", and the flow proceeds to step S055. Note that this engine rotation speed increment flag F_NERGNUP for judgement at the time of half-engaged clutch will be described later.

In step S055, it is determined whether the motor assist determination flag F_MAST is "1". This flag is used to determine whether the engine is assisted by the motor M, and when the flag is "1" it is determined that the assistance by the motor is requested, and when the flag is "0", it is determined that no assistance is requested. Note that this motor assist determination flag is determined in response to the driver's desired acceleration (such as by depression of the acceleration pedal), remaining battery charge, the intake passage pressure, and the vehicle speed.

When the determination in step S055 is "NO", the flow proceeds to step S061. When the determination is "YES", the flow proceeds to step S056.

In step S061, it is determined whether the MT/CVT determination flag F_AT is "1". If the result is "NO", that is, if it is determined that the vehicle is an MT vehicle, the flow proceeds to step S063. When the determination in step S061 is "YES", that is, when the vehicle is the CVT vehicle, the flow proceeds to step S062, wherein it is determined whether the reverse position determination flag F_ATPR is "1". When the determination is "YES", that is, the gear is in the reverse position, the flow proceeds to step S085, and when the determination is "NO", that is, it is determined that the gear position is not the reverse position, the flow proceeds to step 063.

In step S056, it is determined whether the MT/CVT determination flag F_AT is "1". If the determination is "NO" indicating that the vehicle is an MT vehicle, the flow proceeds to step S058 shown in FIG. 7.

In step S058, it is determined whether the final charge command value REGENF is less than "0". When the determination is "YES", that is, the value is less than 0, the flow proceeds to step S059 for executing the "acceleration mode", and the control is completed.

When the determination in step S058 is "NO", that is, the final charge command value is greater than 0, the control is completed.

When the determination in step S056 is "YES", that is, the vehicle is a CVT vehicle, the flow proceeds to step S057, wherein it is determined whether the brake ON determination flag F_BKSW is "1". When the determination instep S057 is "YES", that is, the brake is depressed, the flow proceeds to step S063. When the determination in step S057 is "NO" indicating that the brake is not depressed, the flow proceeds to step S058.

In step S063, it is determined whether the engine vehicle speed is "0". When the determination is "YES", indicating that the vehicle speed is 0, the flow proceeds to step S083 shown in FIG. 7. If the determination in step S063 is "NO" indicating that the vehicle speed is not 0, the flow proceeds to step S064.

In step S064, it is determined whether the engine stop control execution flag F_FCMG is "1". When the determination indicates that the flag is "0" (NO), the flow then proceeds to step S065 in FIG. 6. If the determination in step S064 indicates that the flag is "1" (YES), the flow proceeds to step S084 shown in FIG. 7.

Figure 6:
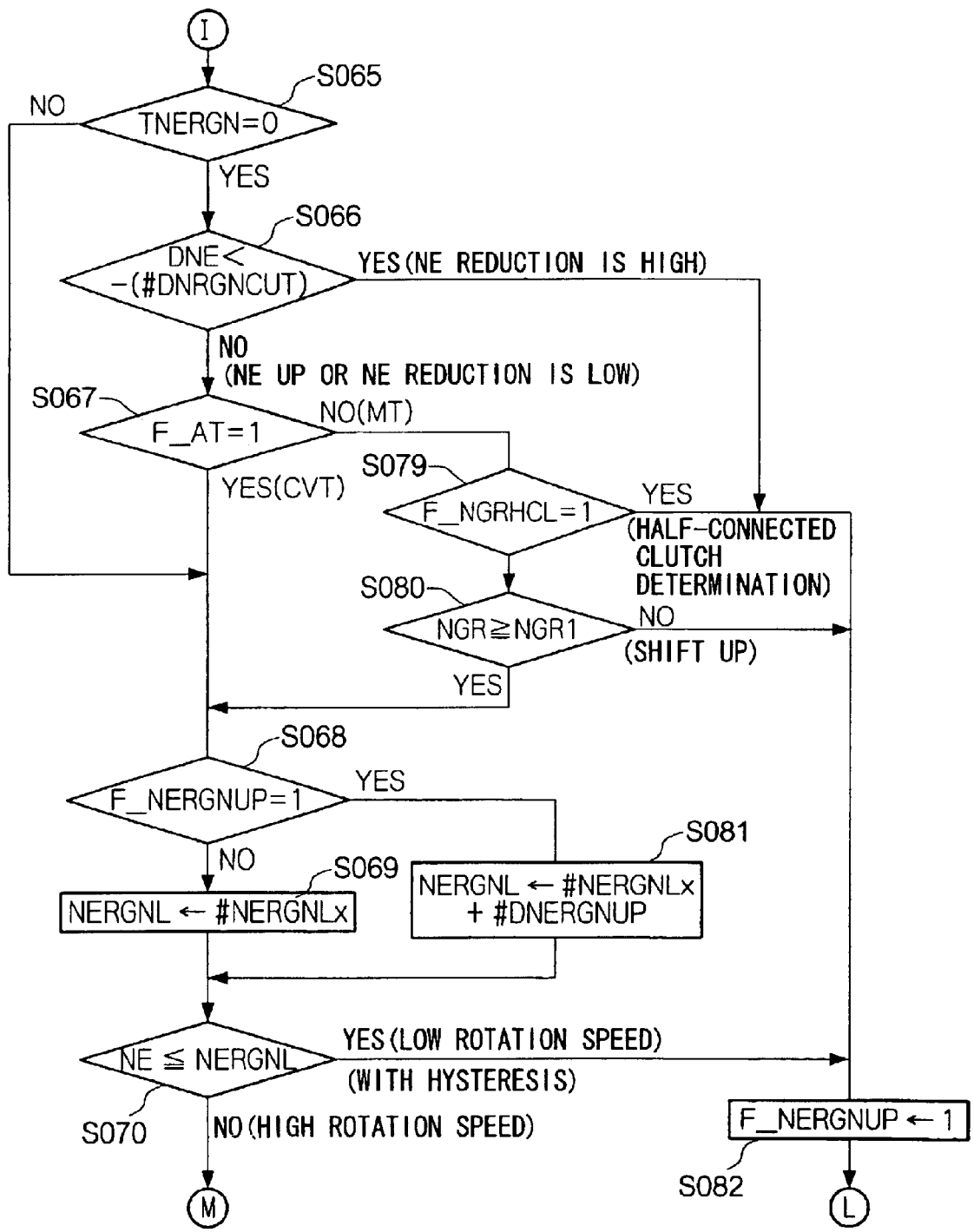
FIG. 6 is a flowchart showing an MA (motor) standard mode according to the first embodiment of the present invention.
Figure 7:
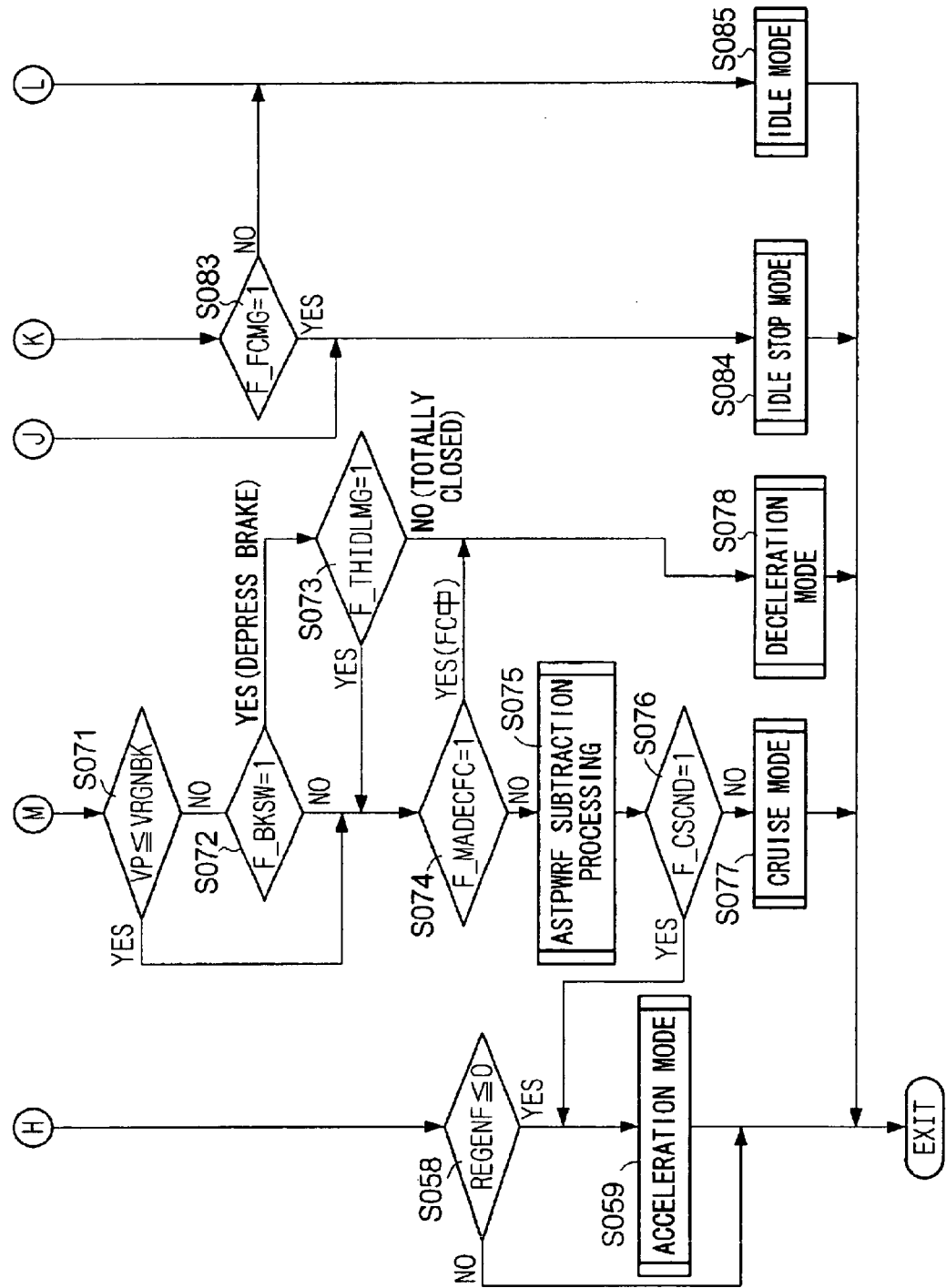
FIG. 7 is a flowchart showing an MA (motor) standard mode according to the first embodiment of the present invention.

In step S065 shown in FIG. 6, it is determined whether the shift change forced REGEN release determination processing delay timer TNERGN is "0". When the determination in step S065 indicates that the shift change forced REGEN release determination processing delay timer TNERGN is "0" (YES), the flow proceeds to step S066. If the determination in step S065 is not "0" (NO), the flow proceeds to step S068.

In step S066, it is determined whether the rate of change of the engine rotation speed DNE is lower than the value of a DNE subtracted REGEN determination engine rotation speed #DNRGNCUT. Here, the DNE subtracted REGEN determination engine rotation speed #DNRGNCUT is the changing rate DNE of the engine rotation speed NE which serves as a standard for determining whether the amount of power generation is subtracted in response to the changing rate DNE of the engine rotation speed NE.

When it is determined in step S066 that the engine rotation speed NE is remarkably reduced (the reduction rate) (YES), the flow proceeds to step S082. In step S082, the engine rotation speed increment flag F_NERGNUP for judgement at the time of half-engaged clutch is set to "1" and the flow proceeds to step S085 shown in FIG. 7.

The engine rotation speed increment flag F_NERGNUP for judgement at the time of the half-engaged clutch is provided by the following reasons. In order to prevent the determination in step S70 (described later) from hunting at each time when the engine rotation speed NE changes when the clutch is half-engaged, the engine rotation speed NE is increased when the clutch is half-engaged. In order to make clear, the engine rotation speed increment flag F_NERGNUP at the time of half-engaged clutch is provided.

When it is determined in step S066 that the engine rotation speed is increased or the reduction of the engine rotation speed is low (NO), the flow proceeds to step S067.

In step S067, it is determined whether the MT/CVT determination flag F_AT is "1". When the determination in step S067 indicates that the vehicle is an MT vehicle (F_AT=0, NO), the flow proceeds to step S079. When the determination in step S067 indicates that the vehicle is a CVT vehicle (F_AT=1, YES), the flow proceeds to step S068.

In step S068, it is determined whether the half-engaged clutch judgement flag F_NGRHCL is "1". When the determination indicates that the vehicle is in the half-engaged clutch state (YES), the flow proceeds to step S082. When the determination indicates that the vehicle is not in the half-engaged clutch state (NO), the flow proceeds to step S080.

In step S080, a comparison is made between the previous gear position NGR and the present gear position NGR1, in order to determine whether the gear position has been shifted up. When the gear positions have not been shifted up (NO), the step proceeds to step S082. When, in contrast, the gear positions have been up-shifted (YES), the step proceeds to step S068. When the vehicle is in the half-engaged clutch state, in order to prevent the clutch from wear due to the rotation of the motor during the cruise mode, the flow proceeds to step S082, and thereafter the operation is changed to the idle mode. In contrast, since the engine rotation speed is reduced when the gear position has been shifted up from the half-clutch state, the flow proceeds to step S082 and thereafter changes to the idle mode, it is not appropriate to conduct the cruise power generation.

In step S068, it is determined whether the engine rotation speed increment flag F_NERGNUP for judgement at the time of the half-engaged clutch is "1". When the determination in step S068 is YES, and the flag is set to "1", that is, it is determined that it is necessary to increase the engine rotation speed at the half-engaged clutch state, the flow proceeds to step S081, wherein the increment rotation speed #DNERGNUP for preventing hunting is added to the lower limit engine rotation speeds #NERGNLx for the battery charge which are set for each gear position and the engine rotation speed for charging lower limit NERGNL is set to the thus added value, and the flow proceeds to step S070. When the determination in step S068 indicated that the flag is reset (=0) and that it is not necessary to increment the engine rotation speed (NO), the flow proceed to step S069, wherein the engine rotation speed lower limit NERGNL is set to the engine rotation speed for charging #NERGNLx set for each gear position, and the flow proceeds to step S070.

Subsequently, in step S070, it is determined whether the engine rotation speed NE is lower than the engine rotation speed lower limit NERGNL for the battery charge. When the determination in step S070 indicates that the engine rotation speed NE is equal to or lower than the engine rotation speed lower limit NERGNL for the battery charge (NE≦NERGNL, YES), the flow proceeds to step S082. When the determination in step S070 indicates that the engine rotation speed NE is high (NE>NERGNL, NO), the flow proceeds to step S072 in FIG. 7. In step S070 in FIG. 7, a comparison is made between the vehicle speed VE and the deceleration mode brake judgement lower limit vehicle speed #VRGNBK. Note that this deceleration mode brake judgement lower limit vehicle speed #VRGNBK has hysteresis.

In step S071, when the determination indicates that the vehicle speed VE≦(the deceleration mode brake judgement lower limit vehicle speed #VRGNBK) (YES), the flow proceeds to step S074. When it is indicated that vehicle speed VE>the deceleration mode brake judgement lower limit vehicle speed #VRGNBK (NO), the flow proceeds to step S072. In step S072, it is determined whether the brake ON determination flag F_BKSW is "1". When the determination in step S072 indicates that the brake is depressed (YES), the flow proceeds to step S073. When it is determined that the brake is not depressed (NO), the flow proceeds to step S074.

In step S073, it is determined whether the IDLE determination flag F_THIDLMG is "1". When the determination indicates that the throttle is totally closed (NO), the flow proceeds to step S78 and the control is completed. Note that in the deceleration mode, regenerative braking by the motor M is executed. When the determination in step S073 indicates that the throttle is not totally closed (YES), the flow proceeds to step S074.

In step S074, it is determined whether the deceleration fuel cut execution flag F_MADECFC is "1". This flag determines to cut the fuel supply when the vehicle speed is high.

When the determination in step S074 indicates that the fuel supply is being cut (YES), the flow proceeds to step S078. When the determination in step S074 indicates that the fuel supply still continues (NO), the flow proceeds to step S076.

In step S076, it is determined whether the cylinder pause execution flag F_CSCND is "1". This cylinder pause execution flag F_CSCND is a flag of which value is set later in FIG. 8, and when this flag value is "1", all of the cylinder are paused and when this flag value is "0", all of the cylinders are operated.

When the determination in step S076 indicates that the cylinder pause execution flag is "1" and that all of the cylinders are paused (YES), the flow proceeds to step S059 for changing the drive mode to the acceleration mode. When the determination in step S076 indicates the cylinder pause execution flag is "0" and that all of the cylinders are in operation (NO), the flow proceeds to step S077 for changing the drive mode to the cruise mode. In this cruise mode, the motor M does not rotates and the vehicle travels by the engine. In some cases, the motor is operated for regenerative operation or the motor is operated as a generator for charging the battery 3.

[Cylinder Pause Execution Determination]

Next, the cylinder pause execution determination in step S009 in FIG. 2 will be described based on the flowchart shown in FIG. 8. This cylinder pause execution determination determines whether the all-cylinder paused driving is executed at the time of deceleration or low load cruising. This determination is carried out for improving the fuel consumption efficiency and this process is thus employed during deceleration mode or acceleration mode.

Here, the all-cylinder paused driving means to totally close the intake valves and the exhaust valves of all cylinders. Practically, when it is determined to execute the cylinder pausing operation based on the flowchart shown in FIG. 8 (which is described later), the variable valve timing mechanism VT is actuated, as shown in FIG. 1, based on the signal from the FIECU both intake valves IV and exhaust valves EV are closed.

In step S150, it is determined whether the engine rotation speed NE is within a predetermined range (NECSL<NE<NECSH). When the determination in step S150 indicates that the engine rotation speed is within a predetermined range (YES), the flow proceeds to step S151. When the determination in step S150 indicates that the engine rotation speed is out of the predetermined range (NO), the flow proceeds to step S156, wherein the cylinder pause execution flag F_CSCND is set to "0", and the control is completed.

In step S151, it is determined whether the air intake passage pressure PBA is within a predetermined range. When the determination in step S151 indicates that the air intake passage pressure PBA is within a predetermined range (YES), the flow proceeds to step S152. When the determination in step S151 indicates that the air intake passage pressure PBA is out of the predetermined range (NO), the flow proceeds to step S156.

In step S152, it is determined whether the vehicle speed VP is within a predetermined range (VPCSL<VP<VPCSH). When the determination instep S152 indicates that the vehicle speed is within a predetermined range (VPCSL<VP<VPCSH), the flow proceeds to step S153. When the vehicle speed is out of the predetermined range (NO), the flow proceeds to step S156.

In step S153, it is determined whether the throttle opening TH is within a predetermined range (THCSL<TH<THSH). When it is determined in step S153 that the throttle opening is within a predetermined range (YES), the flow proceeds to step S154. When it is determined in step S153 that the throttle opening is out of the predetermined range (YES), the flow proceeds to step S156. When the throttle opening is low, it is estimated that the vehicle is decelerating. In addition, it is possible to use the changing rate of the throttle opening ΔTH at the lower opening range as one of conditions in which vehicle mode is changing towards the deceleration side.

Next, in step S154, a comparison is made between the negative pressure in the brake master power cylinder MPGA and the all-cylinder pause execution brake master power cylinder upper limit negative pressure #MPFCMG. When the comparison indicates that the negative pressure in the brake master power cylinder MPGA is higher than the all-cylinder pause execution brake master power cylinder upper limit negative pressure #MPFCMG, that is, the negative pressure in the brake master power cylinder MPGA is close to the atmospheric pressure (MPGA≧#MPFCMG, YES), the flow proceeds to step S156. When the comparison in step S154 indicates that the negative pressure in the brake master power cylinder MPGA is lower negative side than the all-cylinder pause execution brake master power cylinder upper limit negative pressure #MPFCMG (MPGA<#MPFCMG, NO), the flow proceeds to step S155. This condition is set because it is not preferable to execute the all-cylinder pausing operation when the negative pressure in the brake master power cylinder MPGA is not sufficiently obtained.

In step S155, a comparison is made between the temperature of the catalytic device TCAT and the optimum temperature TO of the catalytic device. When the comparison in step S155 indicates that the temperature of the catalytic device TCAT is lower than the optimum temperature of the catalytic device TO (TCAT≦TO, NO), the flow proceeds to step S156. If the all-cylinder pausing operation is executed when the temperature of the catalytic device is not sufficiently high, this is not preferable because the temperature of the catalytic device will further decreased because neither the exhaust gas nor fresh air will flow in the passage. When the determination instep S155 indicates that the temperature of the catalytic device TCAT is higher than the optimum temperature of the catalytic device TO (TCAT>TO, NO), the flow proceeds to step S157, wherein the cylinder pause execution flag F_CSCND is set to "1", and the control is completed.

That is, the cylinder pause execution is permitted only when the aforementioned step S150, step S151, step S152, step S153, step S154, and step S155 are fulfilled, and the control is executed with reference to the cylinder pause execution flag F_CSCND.

[Deceleration Mode]

The deceleration mode will be explained with reference to flowcharts shown in FIGS. 9 and 10. In step S300, it is determined whether the cylinder pause execution flag F_CSCND is "1". When the determination indicates that the cylinder pausing operation is executing (YES), the flow proceeds to step S309. When the determination indicates that the cylinder pausing operation is not executing (NO), the flow proceeds to step S301.

In step S301, it is determined whether the brake switch flag F_BKSW is "1". When the determination indicates that the brake is in the ON state (YES), the flow proceeds to S304, wherein deceleration regeneration calculation values DECRGN for a MT vehicle as well as for a CVT vehicle are obtained by retrieving a REGENBR table, and the flow proceeds to step S305. In step S305, a deceleration regeneration correction value DRGVEL is obtained based on the average consumption current VELAVE by retrieving the #DRGBVEL table, and the flow proceeds to step S404.

When the determination in step S301 indicates that the brake is in the OFF state (NO), the deceleration regeneration calculation values DECRGN for the MT vehicle and the CVT vehicle are obtained by retrieving the "REGEN table, and the flow proceeds to step S303. In step S303, the deceleration regeneration correction value is obtained based on the average consumption current VELAVE by retrieving the #DRGVELN table, and the flow proceeds to step S306. Here, the average consumption current VELAVE is introduced in order to secure the amount of regeneration when the current consumption by the 12V auxiliary battery increases.

In step S306, it is determined whether the remaining battery charge QBAT is higher than a predetermined remaining battery charge #QBCRSR. When the determination indicates that the remaining batter charge QBAT is higher than the predetermined remaining battery charge #QBCRSR (YES), the flow proceeds to step S307. In contrast, when the determination indicates that the remaining battery charge QBT is lower than the predetermined remaining battery charge #QBCRSR (NO), the flow proceeds to step S404 shown in FIG. 10.

In step S307, it is determined whether the vehicle speed VP is higher than a predetermined vehicle speed #VRSMS. When the determination indicates that the vehicle speed VP is higher than the predetermined vehicle speed #VRSMS (YES), the flow proceeds to step S308. When the determination indicated that the vehicle speed VP is lower than the predetermined vehicle speed #VRSMS (NO), the flow proceeds to step S404 shown in FIG. 10. Note that both of the aforementioned predetermined remaining battery charge #QBCRSRH and the predetermined vehicle speed #VRSMS have hystereses.

Figure 10:
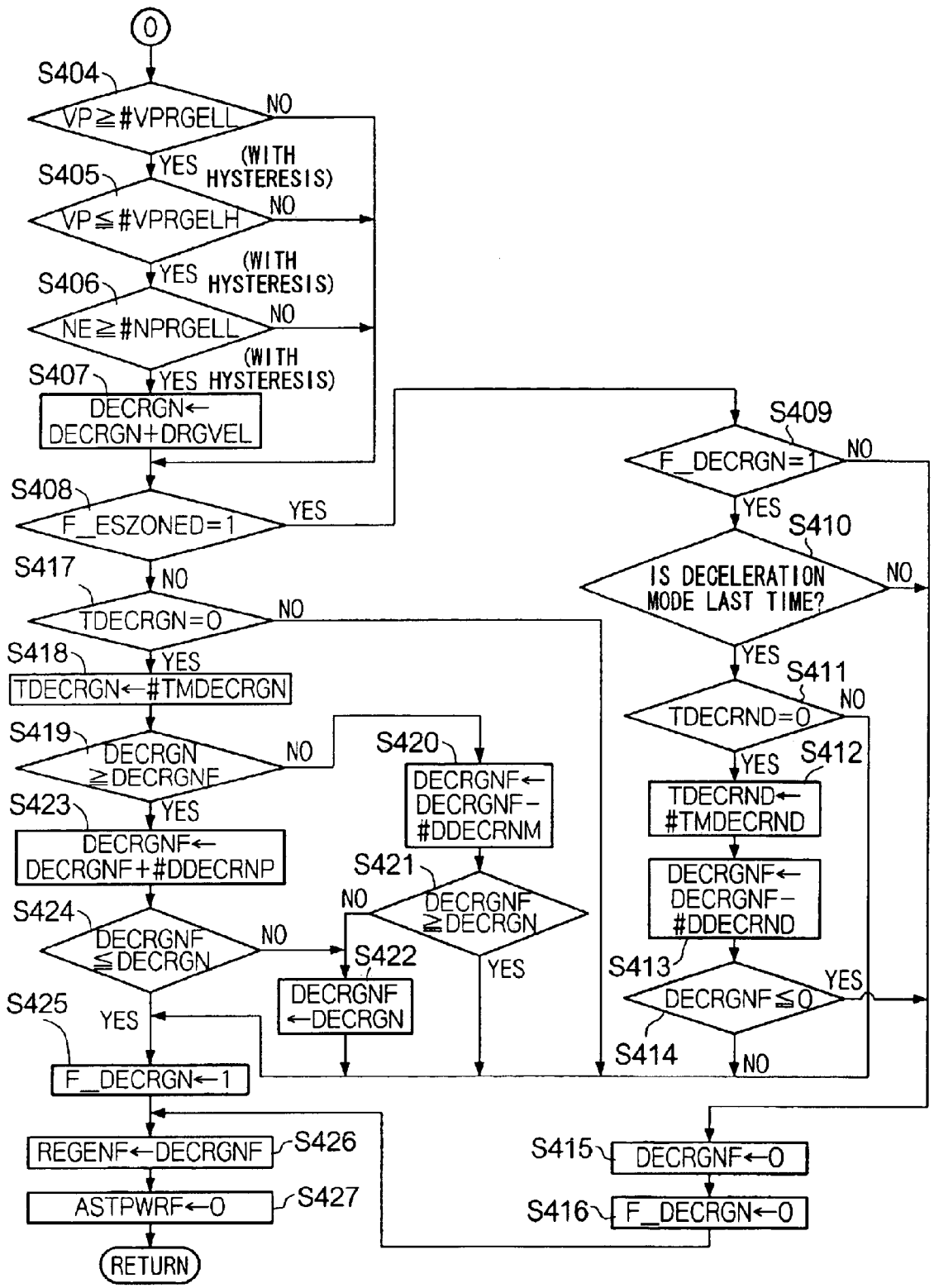
FIG. 10 is a flowchart showing the deceleration mode according to the first embodiment of the present invention.

In step S308, a new deceleration regeneration calculation value DECRGN is obtained by multiplying a coefficient #KRSMS with the deceleration regeneration calculation value DECRGN, and the flow proceeds to step S404 in FIG. 10. That is, when it is determined in step S306 that a certain degree of the remaining battery charge QBT is remaining, and when it is determined in step S307 that the vehicle speed is high, the driver of the vehicle feels that the vehicle is decelerating if the regeneration braking is high. The driver thereby depresses the brake pedal, and the hunting may takes place. The above correction for reducing the deceleration regeneration calculation value DECRGN by multiplying the coefficient #KRSMS is conducted by preventing the above hunting.

When the determination in step S300 indicates that the cylinder pausing operation is executing (YES), the flow proceeds to step S309. In step S309, it is determined whether the remaining battery charge QBAT is higher than the pause cylinder regeneration execution upper limit remaining charge #QBATRCS. When the determination indicates that the remaining battery charge QBAT is higher than the pause cylinder regeneration execution upper limit remaining charge #QBATRCS (YES), the flow proceeds to step S301. When the determination in step S309 indicates that the remaining battery charge QBAT is lower than the pause cylinder regeneration execution upper limit remaining charge #QBATRCS (NO), the flow proceeds to step S310.

As described above, the control is executed so as to secure a higher amount of regeneration in the case that the cylinder pausing operation is executed than the case that the cylinder pausing operation is not executed. Thus, a restriction is provided in order to prevent the battery from overcharging by prohibiting to proceed to step S301 for executing the cylinder pausing operation.

In step S310, it is determined whether the brake switch flag F_BKSW is "1". When the determination indicates that the brake is in the ON state (YES), the flow proceeds to step S313, wherein the deceleration regeneration calculation values DECRGN for the MT vehicle and the CVT vehicle are obtained by retrieving the #REGENBRCS table, and the flow further proceeds to step S314. Note that the deceleration regeneration calculation values DECRGN obtained by retrieving the #REGENBRCS table are incremented than the deceleration regeneration calculation values DECRGN obtained by retrieving the deceleration regeneration calculation DECRGNBR table.

In step S314, a deceleration regeneration correction value DRGVEL is obtained based on the average consumption current VELAVE by retrieving the #DRGBVEL table, and the flow proceeds to step S404.

When the determination in step S310 indicates that the brake is in the OFF state (NO), the flow proceeds to step S311, wherein the deceleration regeneration calculation values DECRGN for the MT vehicle and the CVT vehicle are obtained by retrieving the #REGENCS table, and the foow further proceeds to step S312. Note that the deceleration regeneration calculation values DECRGN for the MT vehicle and the CVT vehicle are obtained by retrieving the #REGENCS table are incremented than the deceleration regeneration calculation value DECRGN obtained in step S302. In step S312, the deceleration regeneration correction value DRGVEL is obtained based on the average consumption current VALAVE by retrieving the #DRGVELN table, and the flow proceeds to step S315.

In step S315, it is determined whether the remaining battery charge QBAT is higher than the predetermined remaining battery charge #QBCRSR. When the determination indicates that the remaining battery charge QBAT is higher than a predetermined remaining battery charge #QBCRSRH (YES), the flow proceeds to step S316. When the determination indicates that the remaining battery charge QBAT is lower than a predetermined remaining battery charge #QBCRSRH (NO), the flow proceeds to step S404 shown in FIG. 10.

In step S316, it is determined whether the vehicle speed VP is higher than the predetermined vehicle speed #VRSMS. When the determination indicates that the vehicle speed VP is higher than a predetermined vehicle speed #VERMS (YES), the flow proceeds to step S317. When the determination indicates that the vehicle speed VP is lower than a predetermined vehicle speed #VRSMS (NO), the flow proceeds to step S404 shown in FIG. 10. Note that the aforementioned predetermined remaining battery charge #QBCRSRH and the aforementioned predetermined vehicle speed #VRSMS have hysteresises, respectively.

In step S317, the deceleration regeneration computation value DECRGN is set to a new deceleration regeneration computation value DECRGN, which is obtained by multiplying a coefficient #KRSMS to the original deceleration regeneration computation value DECRGN, and the flow proceeds to step S404 in FIG. 10. That is, as described above, when it has been determined in step S315 that a certain degree of remaing charge femains in the battery and when it has been determined in step S316 that the vehicle speed is high, the driver feels that the vehicle is decelerating if the deceleration braking is high. The driver will thereby depresses the accelerator pedal, and the hunting takes place. The deceleration regeneration computation value DECRGN is reduced by multiplying the coefficient #KRSMS in step S317 in order to prevent the vehicle from hunting.

Note that the #REGEN table employed in step S302, the #REGENBR table employed in step S304, the #REGENCS table employed in step S311, and the #REGENBRCS table employed in step S313 have respective tables corresponding to respective gear positions.

In step S404, it is determined whether the vehicle speed VP is higher than a predetermined vehicle speed #VPRGELL (for example, 20 km/h). When the vehicle speed VP is higher than the predetermined speed #VPRGELL (YES), the flow proceeds to step S405. When, in contrast, the vehicle speed VP is lower than the predetermined speed #VPRGELL (NO), the flow proceeds to step S408.

In step S405, it is determined whether the vehicle speed is lower than a predetermined vehicle speed #VPRGELH (for example, 90 km/h). When the vehicle speed VP is lower than the predetermined speed #VPRGELH(YES), the flow proceeds to step S406. When, in contrast, the vehicle speed VP is higher than the predetermined speed #VPRGELH (NO), the flow proceeds to step S408. In step S406, it is determined whether the engine rotation speed NE is higher than a predetermined value #NPRGELL. When the engine rotation speed NE is higher than the predetermined speed #NPRGELL (YES), the flow proceeds to step S407. When, in contrast, the engine rotation speed NE is lower than the predetermined speed #NPRGELL (NO), the flow proceeds to step S408.

In step S407, a deceleration regeneration correction amount DRGVEL is added to the deceleration regeneration computation value DECRGN, and the flow proceeds to step S408. When current consumption of the 12 V auxiliary battery is high, the amount of regeneration is increased for supplying to the battery 3 in order thereby to ensure the state of the battery charge.

In step S408, it is determined whether the energy storage zone D flag F_ESZONED is "1". When the remaining battery charge is in the D zone (YES), the flow proceeds to step S409, wherein it is determined whether the deceleration regeneration permission flag F_DECRGN is "1". Note that the D zone means that the remaining charge of the battery is within a range of 80% to 90 to 100%.

When the determination in step S409 indicates that the deceleration regeneration operation is not permitted (NO), the flow proceeds to step S415, wherein the deceleration regeneration final computation value DECRGNF is set to "0", and in step S416, the deceleration regeneration permission flag F_DECRGN is set to "0".

In addition, in step S426, the deceleration regeneration final computation value DECRGNF (=0) is substituted for a final charge command value REGENF, and in step S427, the final assist command value ASTPWR is set to "0" and the flow returns.

When the determination in step S409 indicates that the deceleration regeneration operation is permitted (YES), it is determined in step S410 whether the previous mode has been the deceleration mode. When the previous mode was not the deceleration mode (NO), the flow proceeds to step S415. When the determination in step S410 that the previous mode was the deceleration mode (YES), the flow proceeds to step S411, wherein it is determined whether the gradual subtraction update timer TDECRND is "0".

In step S411, when it has been determined that the gradual subtraction update timer TDECRND is not "0" (NO), in step S425, the deceleration regeneration flag F_DECRGN is set to "1", and the flow proceeds to step S426.

When it has been determined in step S411 that the gradual subtraction update timer TDECRND is "0" (YES), the flow proceeds to step S412 wherein the gradual subtraction update timer TDECRND is set to a predetermined value #TMDECRND, and the flow proceeds to step S413. In step S413, a subtraction term #DDECRND is gradually subtracted from the deceleration regeneration final computation value DECRGNF. In subsequent step S414, when the deceleration regeneration final computation value DECRGNF becomes less than "0" (YES), the flow proceeds to step S415. When the deceleration regeneration final computation value DECRGNF is higher than "0" (NO), the flow proceeds to step S425.

In step S408, it is determined whether an energy storage zone D flag F_ESZONED is "1", and if the determination indicates that the energy storage zone is not in the D zone (NO), the flow proceeds to step S417.

In step S417, it is determined whether the gradual subtraction update timer TDECRGN is "0". When the determination in step S417 indicates that the gradual subtraction timer TDECRGN is "0" (YES), the flow proceeds to step S418. When the determination in step S417 indicates that the gradual subtraction timer TDECRGN is not "0" (NO), the flow proceeds to step S425.

In step S418, the gradual subtraction update timer TDECRGN is set to a predetermined value #TMDECRGN. In step S419, it is determined whether the deceleration regeneration computation value DECRGN is higher than the deceleration regeneration final computation value DECRGNF. When the determination in step S419 indicates the result is "YES", the flow proceeds to step S423, wherein the gradual addition amount #DDERNP is gradually added to the deceleration regeneration final computation value DECRGNF and in step S424, it is determined again whether the deceleration regeneration computation value DECRGN is higher than the deceleration regeneration final computation value DECRGNF. When it has been determined that the deceleration regeneration computation value DECRGN is higher than the deceleration regeneration final computation value DECRGNF (YES), the flow proceeds to step S425.

When it has been determined that the deceleration regeneration computation value DECRGN is lower than the deceleration regeneration final computation value DECRGNF (NO), the flow proceeds to step S422, wherein the deceleration regeneration final computation value DECRGNF is substituted for the deceleration regeneration computation value DECRGN, and the flow proceeds to step S425.

When the determination in step S419 indicates that the result is "NO", the flow proceeds to step S420, wherein the gradual subtraction amount #DDECRNM is subtracted from the deceleration regeneration final computation value DECRGNF, and in step S421, it is determined whether the deceleration regeneration final computation value DECRGNF is higher than the deceleration regeneration computation value DECRGN. When the determination in step S421 indicates that the deceleration regeneration computation value DECRGNF is higher than the deceleration regeneration final computation value DECRGNF (NO), the flow proceeds to step S422. When the determination in step s421 indicates that the deceleration regeneration final computation value DECRGNF is higher than the deceleration regeneration computation value DECRGN (YES), the flow proceeds to step S425.

Figure 5:
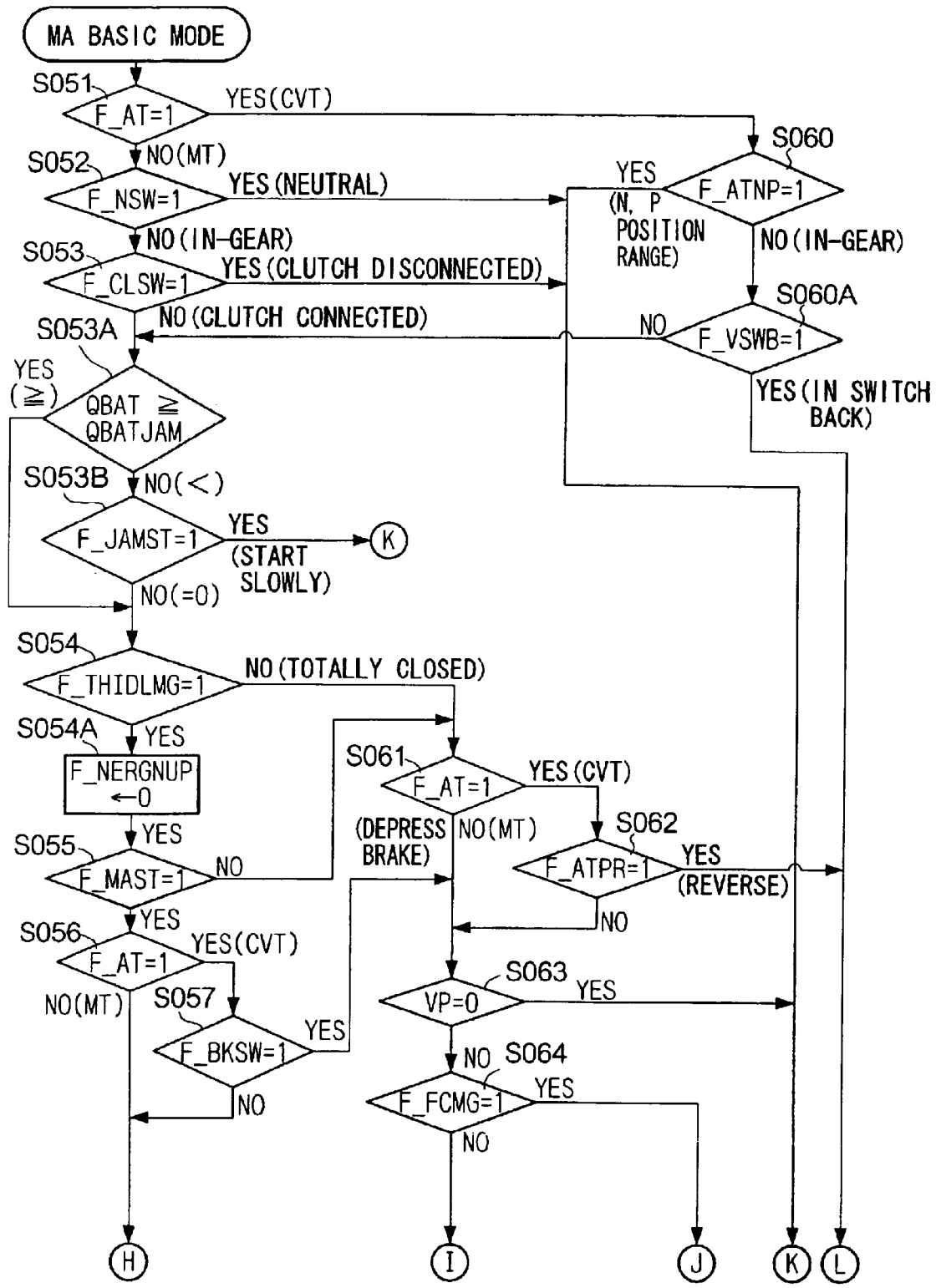
FIG. 5 is a flowchart showing an MA (motor) standard mode according to the first embodiment of the present invention.

Note that, when the driver depresses the accelerator pedal during the deceleration regeneration operation, the driving mode of the vehicle is converted to the acceleration mode (as shown in Step S055 in FIG. 5). If the driver starts the engine in the acceleration mode, the fuel consumption efficiency is deteriorated. In such a case, the fuel is cut and the vehicle is driven only by the motor M in order to improve the fuel consumption efficiency. Below, the acceleration mode is described.

[Acceleration Mode]

Figure 11:
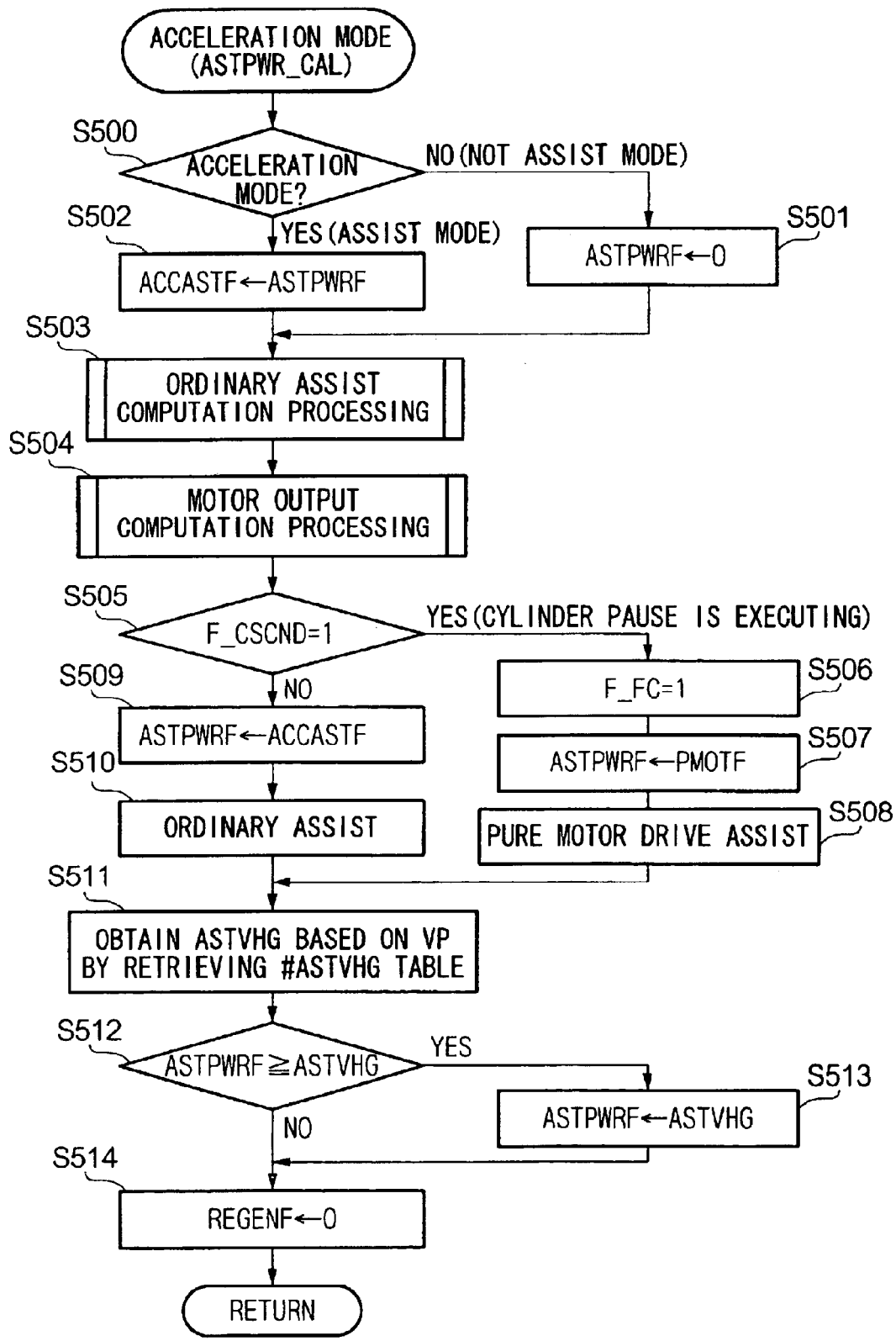
FIG. 11 is a flowchart showing the acceleration mode according to the first embodiment of the present invention.

The acceleration mode will be described with reference to a flowchart shown in FIG. 11.

In step S500, it is determined whether the vehicle is in the acceleration (assist) mode. When the vehicle is not in the acceleration mode (NO), the flow proceeds to step S501, wherein the final assist command value ASTPWRF is set to "0", and tyeflow further proceeds to step S503.

When the determination in step S500 indicates that the vehicle is in the acceleration (assist) mode, the flow proceeds to step S502, wherein the ordinary assist final computation value ACCASTF is substituted for the final assist command value ASTPWRF and the flow proceeds to step S503.

In step S503, an ordinary assist computation processing is executed. In subsequent step S504, the motor output computation processing is executed and the flow proceeds to step S505.

In step S505, it is determined whether the cylinder pause execution flag F_CSCND is "1". As described in FIG. 8, this cylinder pause execution flag F_CSCND is converted to "1" when certain conditions are satisfied.

When the determination in step S505 indicates that the cylinder pausing operation is executed (YES), the flow proceeds to step S506. If the determination result indicates that the cylinder pausing operation is not executed (NO), the flow proceeds to step S509. In step s509, the final assist command value ASTPWRF is substituted for the ordinary assist final computation value ACCASTF.

In step S506, the fuel cut flag F_FC is set to "1" for stopping the engine by cutting the fuel, and in subsequent step S507, the final assist command value ASTPWRF is substituted for the motor output final computation value PMOTF obtained in step S504. In step S508, the vehicle is in a pure motor drive assist state wherein the vehicle travels only by the motor while the engine is stopped, and the flow proceeds to step S511.

In step S509, when the final assist command value ASTPWRF is set to the ordinary assist final computation value ACCASTF, the flow proceeds to step S510, wherein the vehicle is in the ordinary assist state, where driving by the engine is assisted by the motor, and the flow proceeds to step S511.

Subsequently, in step S511, the assist amount upper limit value ASTVHG is obtained by retrieving a table. Accordingly, when the vehicle speed increases to a higher region where the motor assist is no longer necessary, the assist amount gradually decreases, which is advantageous in the energy management.

In step S512, it is determined whether the final assist command value ASTPWRF is higher than the assist amount upper limit value ASTVHG, and when the determination result is "YES", the flow proceeds to step S513, wherein the assist amount upper limit value ASTVHG is set to the final assist command value ASTPWRF, and in step S514, the final electric generation amount is set to "0", and the flow returns. When the determination in step S514 is "NO", the flow proceeds to step S514.

Therefore, when the vehicle is driven only by the motor, the cylinder pausing operation is executed, such that the fuel is cut for improving the fuel consumption efficiency.

[Motor Output Computation Processing]

Figure 12:
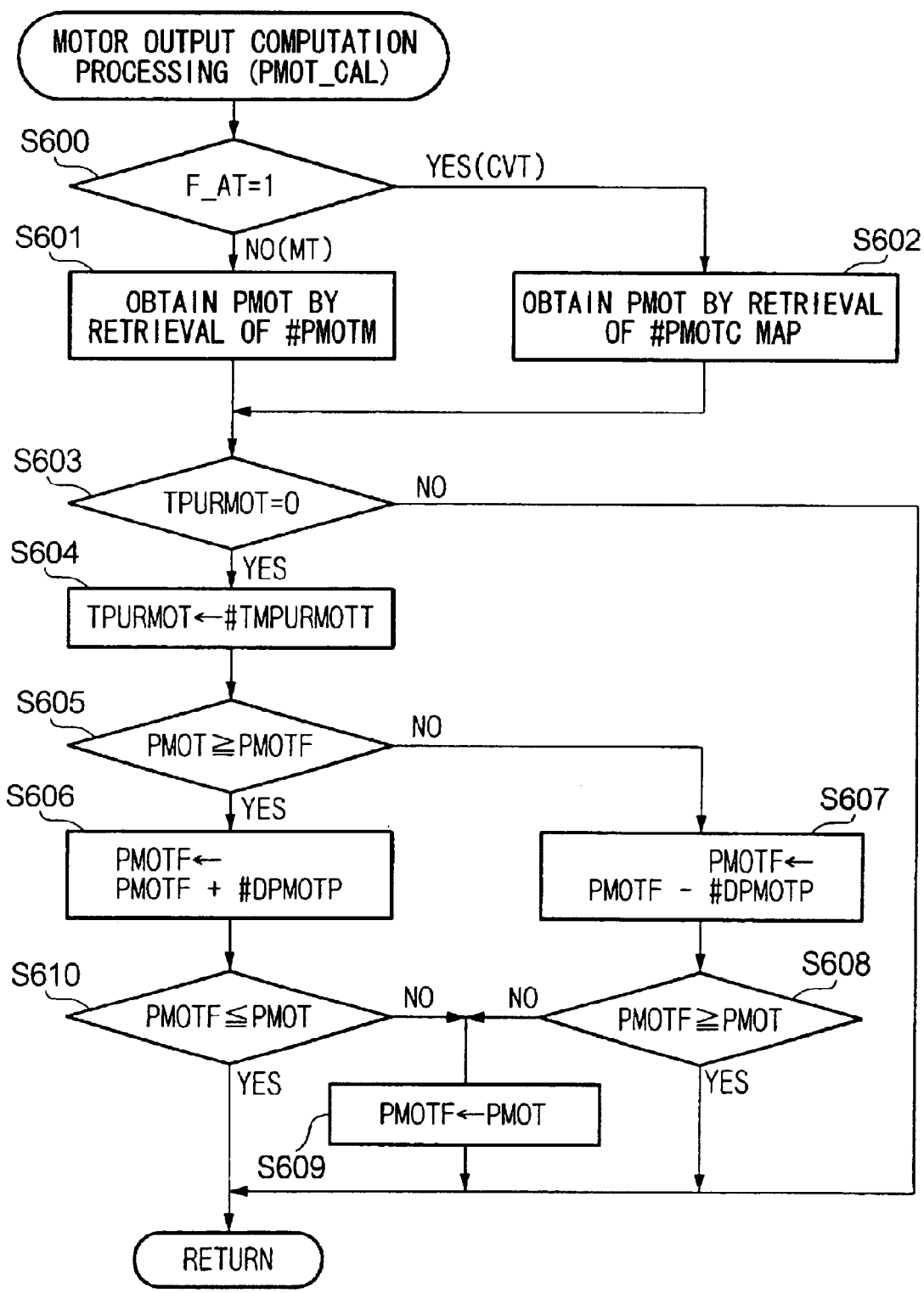
FIG. 12 is a flowchart showing a motor output calculation processing according to the first embodiment of the present invention.

The "motor output computation processing in step S504 shown in FIG. 11 will be described below based on the flowchart shown in FIG. 12.

In step S600, the MT/CVT determination flag F_AT is determined. When it has been determined in step S600 that the vehicle is a MT vehicle (F_AT=0, NO), the flow proceeds to step S601. In step S601, the motor output #PMOTM, which is specified from both engine rotation speed NE and the throttle opening degree TH, is obtained by retrieving the map provided for the MT vehicle. The motor output PMOT is set to the motor output value #PMOTM and the flow proceeds to S603. Note that this map includes values employed for respective gear positions.

When the determination in step S600 indicates that the vehicle is a CVT vehicle (F_AT=1, YES), the flow proceeds to step S602. In step s602, the motor output #PMOTC, which is specified from both the vehicle speed VP and the throttle opening degree TH, is obtained by retrieving the map provided for the CVT vehicle. Note that this map also includes values employed for respective gear positions.

In step S603, it is determined whether the gradual subtraction update timer TPURMOT is "0". When the gradual subtraction update timer TPURMOT is "0" (YES), the flow proceeds to step S604. When it has been determined in step S603 that the gradual subtraction update timer TPURMOT is not "0" (NO), the flow returns.

In step S604, the gradual subtraction update timer TPURMOT is set to a predetermined value #TMPURMOTT. In step S605, it is determined whether the motor output computation value PMOT is higher than the motor output final computation value PMOTF.

When the determination in step S605 indicates "YES", the gradual addition amount #DPMOTP is gradually added to the motor output final computation value PMOTF, and in step S610, it is determined again whether the motor output computation value PMOT is higher than the motor output final computation value PMOTF.

When the determination in step S610 indicates that the motor output computation value PMOT is higher than the motor output final computation value PMOTF (YES), the flow returns.

When the determination in step S610 indicates that the motor output computation value PMOT is lower than the motor output final computation value PMOTF (NO), the flow proceeds to step S609, wherein the motor output computation value PMOT is set to the motor output final computation value PMOTF, and the flow returns.

When the determination in step S605 has been "NO", the flow proceed to step S607, wherein the gradual subtraction amount #DPMOTP is gradually subtracted from the motor output final computation value PMOTF, and in step S608, it is determined again whether the motor output computation value PMOT is lower than the motor output final computation value PMOTF.

When the determination in step S608 indicates that the motor output computation value PMOT is lower than the motor output final computation value PMOTF (YES), the flow returns. When the determination in step S608 indicates that the motor output computation value PMOT is higher than the motor output final computation value PMOTF (NO), the flow proceeds to step S609.

According to the above embodiment, since the all-cylinder pausing operation allows reducing the pumping loss of the engine E and the friction of the valve gear system can be reduced in the present system, without cutting off the power transmission, as in the conventional case of providing a clutch between the engine E and the motor M, the present system increases the regeneration amount remarkably and improves the fuel consumption efficiency without causing any large efficiency drop in the power transmission system.

Figure 9:
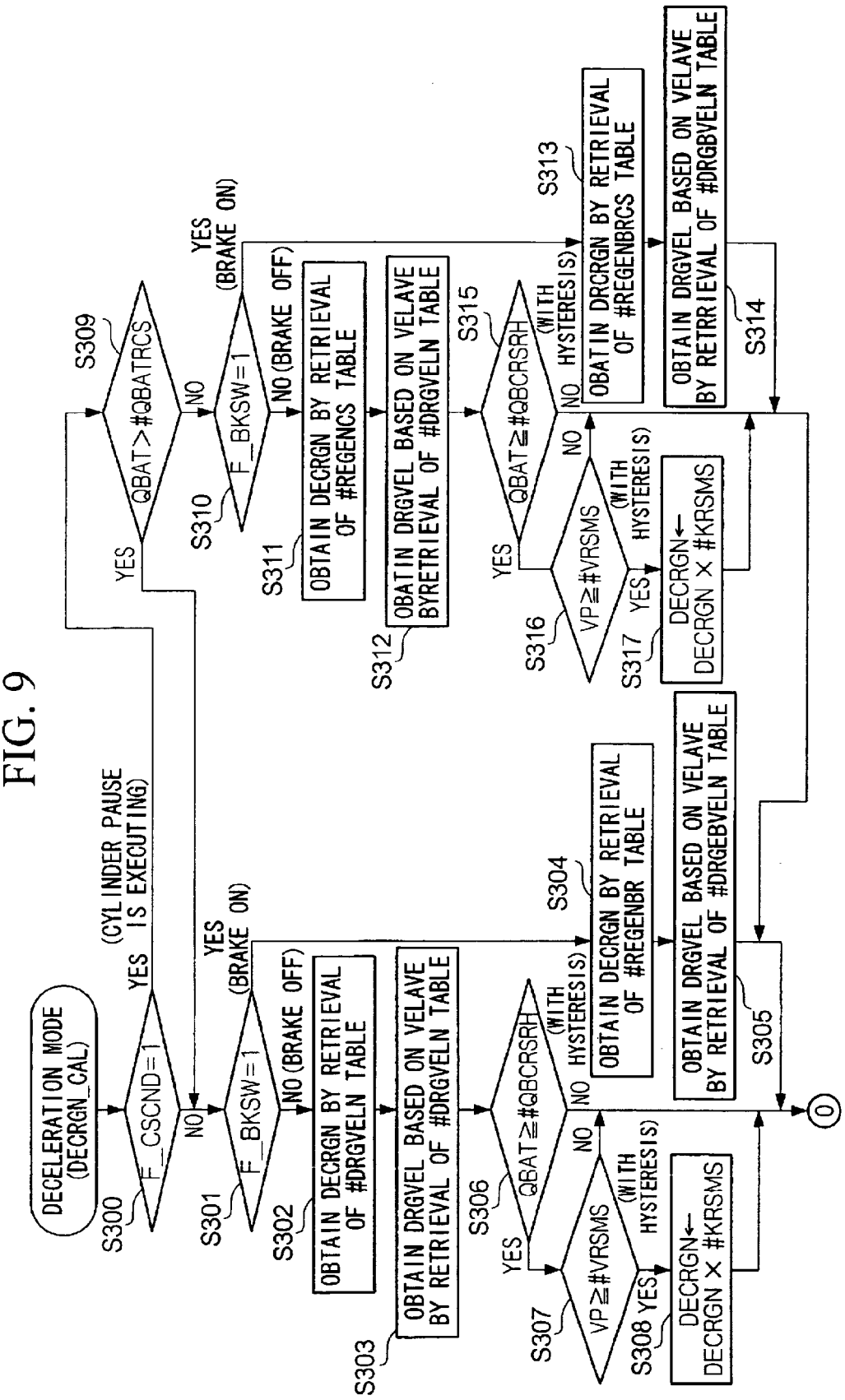
FIG. 9 is a flowchart showing the deceleration mode according to the first embodiment of the present invention.

When it has been determined in step S009 shown in FIG. 2 to execute the all-cylinder pausing operation and during execution of the all-cylinder pausing operation, a higher amount of regeneration energy can be secured in step S311 shown in FIG. 9 than the ordinary regeneration energy obtained in step S302 shown in FIG. 9, so that it is possible to improve the fuel consumption efficiency and to increase the assisting frequency and the assist power by the motor by the increased amount of regeneration power obtained during the all-cylinder pausing operation.

Figure 8:
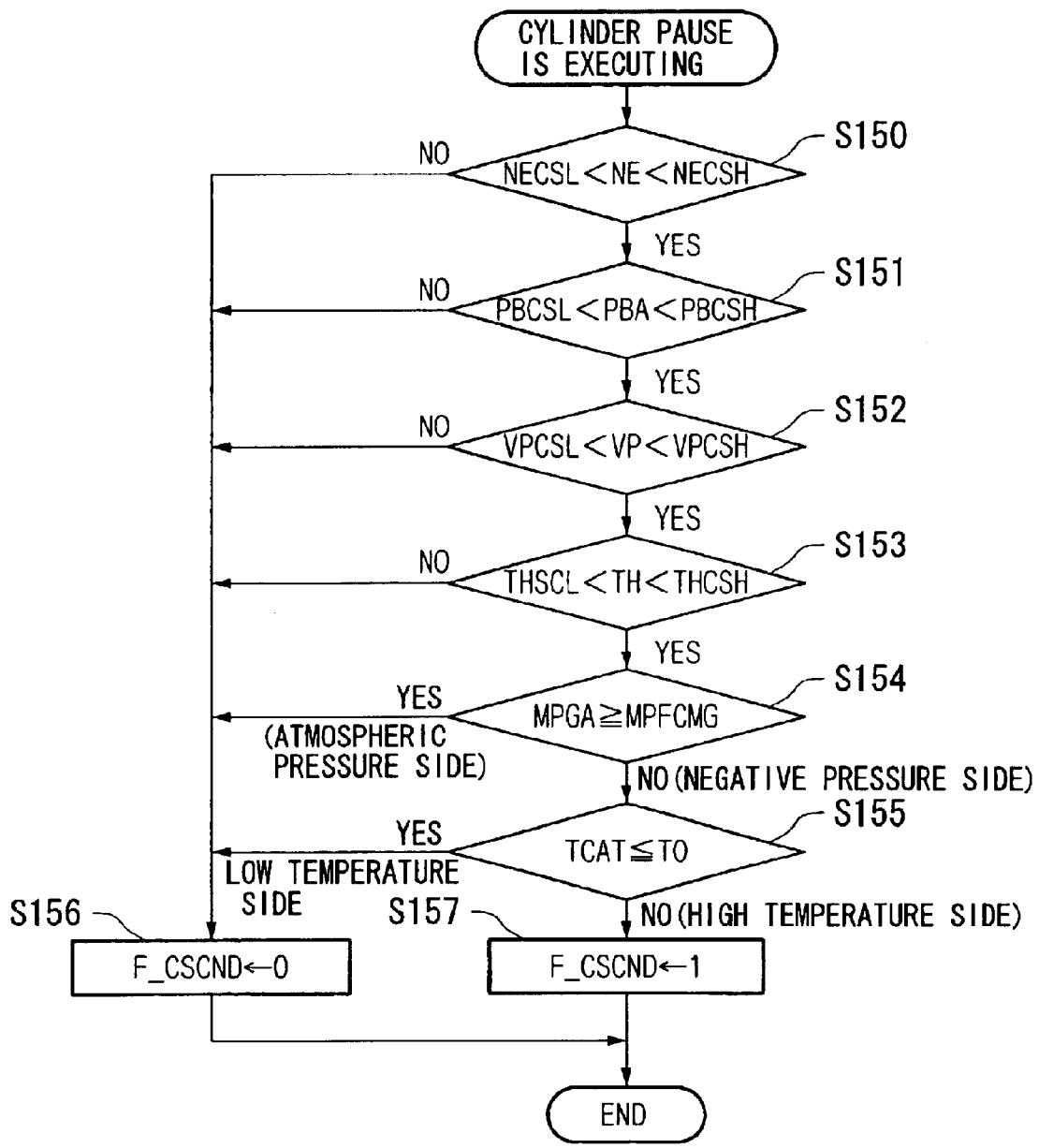
FIG. 8 is a flowchart showing an execution determination of cylinder pause determination according the first embodiment of the present invention.

Furthermore, as shown in FIG. 8, when the negative pressure MPGA in the brake master power cylinder is higher than the threshold value MPFCMG, which corresponds to the pressure nearer to the atmospheric pressure (step S154), it is possible to preferentially hold the negative pressure in the brake master power cylinder by prohibiting the all-cylinder pausing operation, so that the all-cylinder pausing operation does not have a bad influence on the brake system.

In addition, as shown in FIG. 8, when the temperature of the catalytic device TCAT is lower than the catalytic device optimum temperature TO (step S155), the engine can be operated by the all-cylinder driving operation by prohibiting the all-cylinder pausing operation (step S156) in order to increase the temperature of the catalytic device TCAT. The temperature of the catalytic device can thereby be raised quickly and the proper control of the exhaust gas can be realized.

As explained above, in the all-cylinder pause state provided by fully closing both intake valves and the exhaust valves, it is possible to further reduce the mechanical loss including air-flow resistance comparing to the state where the intake valves and exhaust valves are opened. Furthermore, during the all-cylinder pausing operation, although a load is generated when a piston moves toward compression side, this load operates for lifting the piston when the piston moves toward expansion side. Thus, the load generated in the movement toward compression can be effectively utilized and the energy loss due to the load can be reduced.

In the all-cylinder pausing operation conducted by closing both intake valves and exhaust valves, it becomes possible to block inflow of fresh air, which results in preventing the temperature drop of the catalytic device and the A/F sensor and executing a proper control of the exhaust gas. Accordingly, as described above, the all-cylinder pausing operation makes it possible to improve the fuel consumption efficiency remakably while executing the proper control of the exhaust gas without significantly reducing the efficiency of the power transmission system.

In addition, during the deceleration regeneration, if the driver depresses the accelerator pedal, the vehicle will be converted to the acceleration mode and if the engine is started in the acceleration mode, the fuel consumption rate will be deteriorated. In order to avoid the deterioration of the fuel consumption efficiency, the present invention provides a process of cutting the fuel in step S506 shown in FIG. 11 for moving the vehicle only by the motor as shown in step S508 in FIG. 11.

Next, the second embodiment of the present invention will be described with reference to FIGS. 15 to 17.

In the second embodiment, one cylinder out of four cylinders is configured not to carry out the cylinder pausing operation, and the other three cylinders are cylinders which can carry out the cylinder pausing operation. Note that the number of cylinders which can execute the cylinder pausing operation are not limited and the number can be more than one half of the total cylinders.

Thus, the other structure of the second embodiment is the same as that of the first embodiment, and the processing procedures shown in FIGS. 2 to 12 are also the same, so that the same components are denoted by the same reference numbers and their explanations are omitted.

Figure 15:
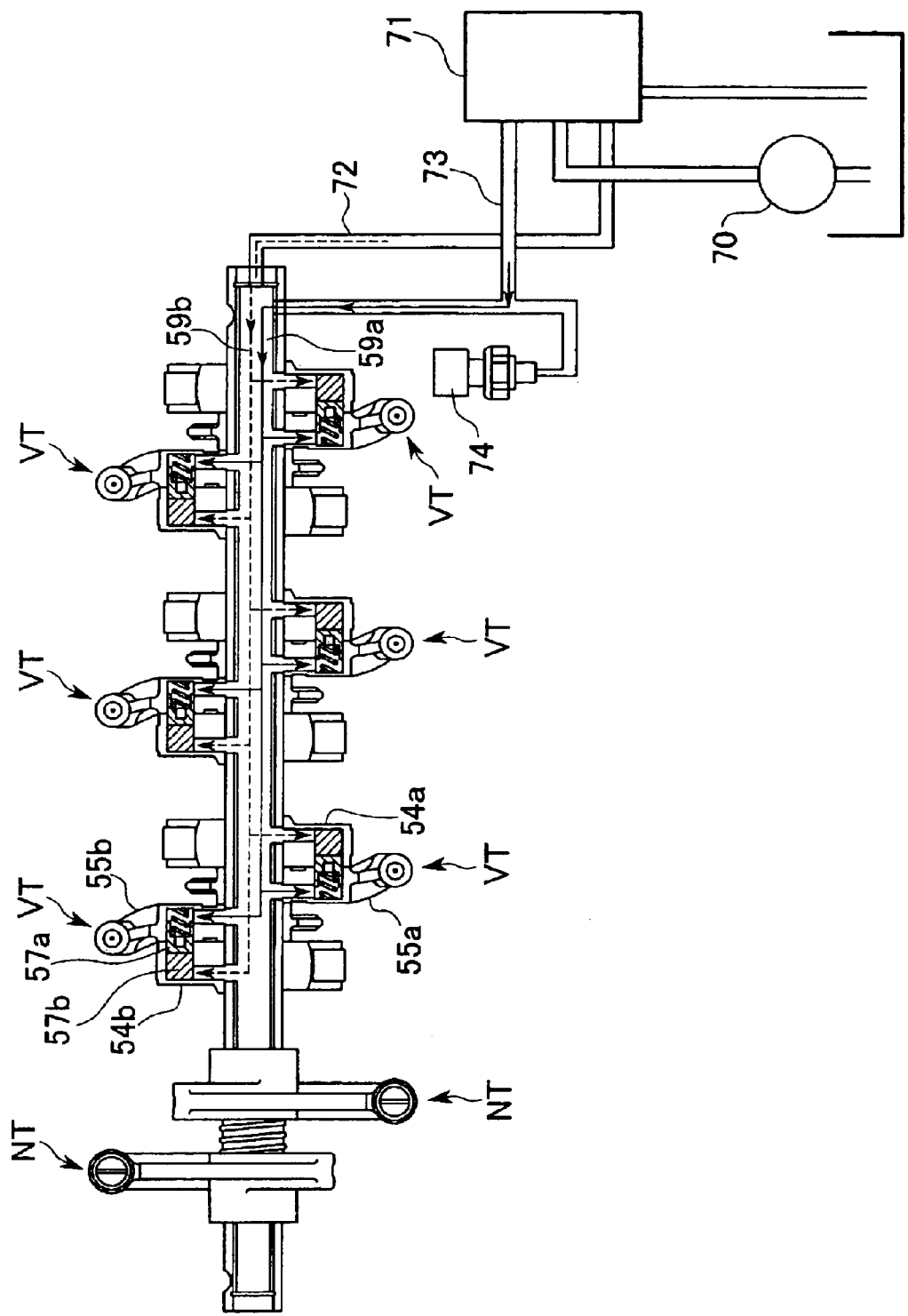
FIG. 15 is a diagram showing the hydraulic circuit according to the second embodiment of the present invention.
Figure 16:
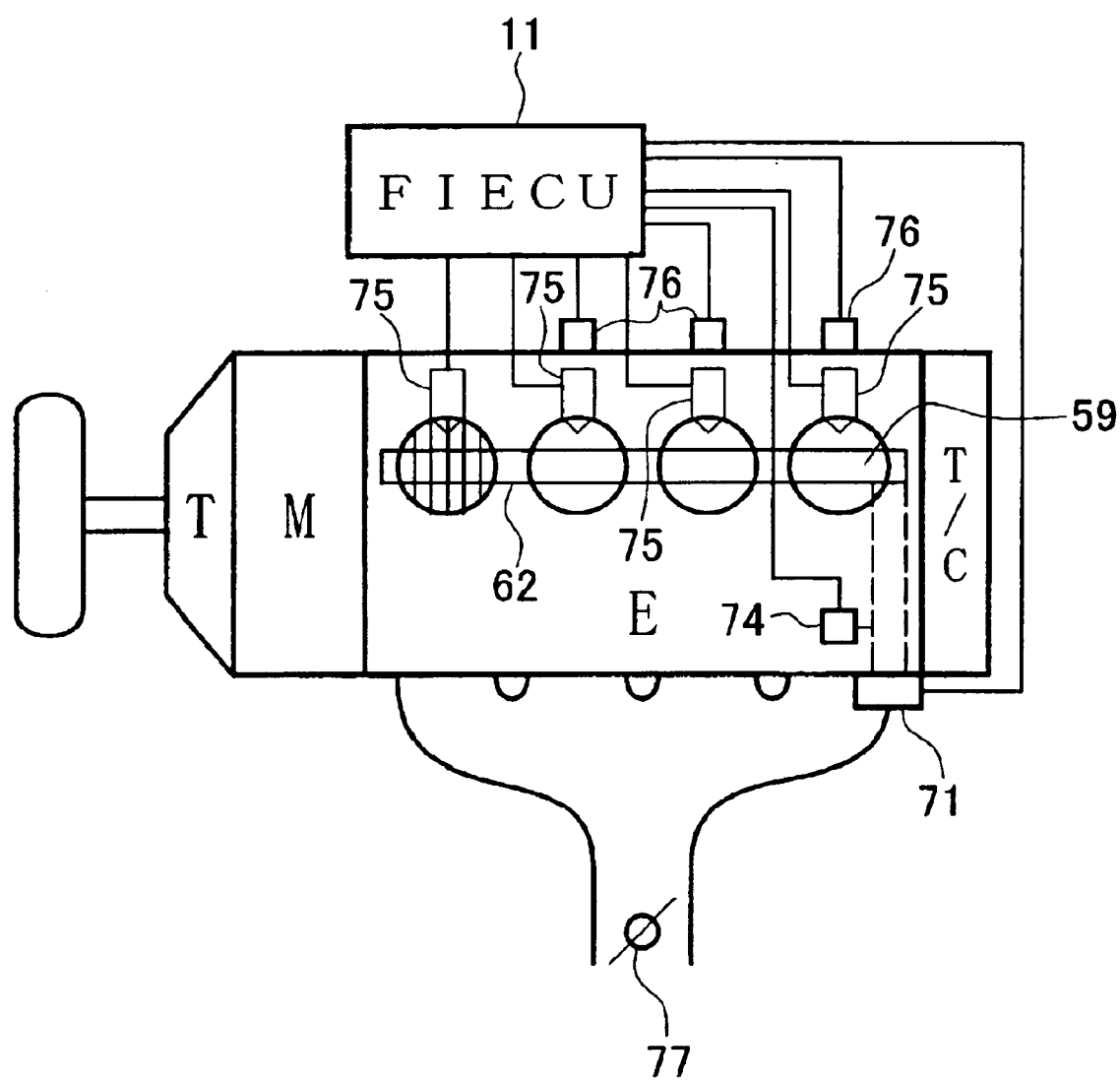
FIG. 16 shows a schematic plan view of the engine according to the second embodiment of the present invention.

In FIGS. 15 and 16, the engine E comprises three cylinders each provided with a variable valve timing mechanism VT (the same as the first embodiment) at the air intake side and the exhaust side for executing the cylinder pausing operation and a regular cylinder which does not execute the cylinder pausing operation.

In FIG. 15, reference numeral 70 denotes an oil pump and 71 denotes a spool valve, and these oil pump 70 and the spool valve 71 are employed for supplying an oil pressure to the variable valve timing mechanism VT. The spool valve 71 is connected to the exhaust side of the oil pump 70. The cylinder pausing operation side passage 72 of the spool valve 71 is connected to the oil pressure passage 59b of the above-described rock arm shaft 62, ad the cylinder pause release side passage 73 of the spool valve 71 I connected to the oil pressure passage 59b. Note that the oil pressure passage 59a and the oil pressure passage 59b are defined each other by the partitioning portion S (see FIG. 14).

A POIL sensor 74 is connected to the cylinder pause release side passage 73. The POIL sensor 74 monitors the oil pressure of the cylinder pause release side passage 73, which becomes low when executing the cylinder pausing operation and becomes high when the vehicle is normally driving.

As shown in FIG. 16, a fuel injection valve 75 is provided for each cylinder, and each fuel injection valve 75 is connected to FIECU 11. A knock sensor 76 is provided to a cylinder, which comprises a variable valve timing mechanism and each knock sensor is used for detecting blowout in the cylinder.

Here, it is noted the spool valve 71 is disposed at an outermost separated position from the cylinder, which does no execute the cylinder pausing operation. Note that reference symbol T/C denotes a timing chain, reference numeral 74 denotes a POIL sensor, and 77 denotes a throttle valve.

Figure 17:
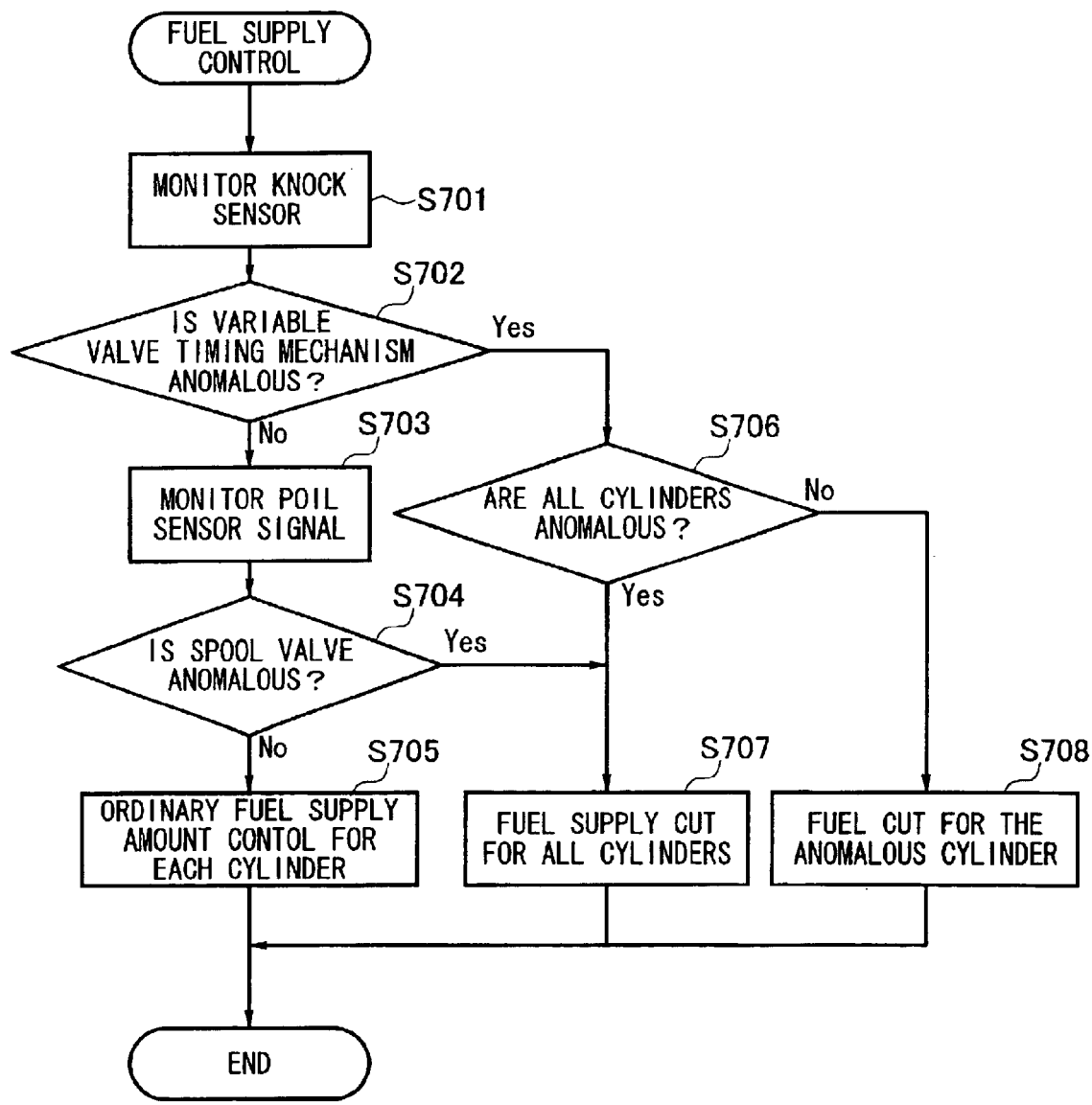
FIG. 17 is a flowchart showing the fuel supply control according to the second embodiment of the present invention.

A fuel supply control operation in the case that an anomaly is detected by the knock sensor 76 based on a flowchart shown in FIG. 17.

The flowchart is formed in order to execute an control operation at the time when the knock sensor 76 detects blowout of a cylinder. The control operation has an objective to maintain the driving force of the engine by the regular cylinder which does not execute the cylinder pausing operation when an anomaly is detected for a variable valve timing mechanism VT of a cylinder capable of executing the cylinder pausing operation and to cut the fuel supply to cylinders capable of executing the cylinder pausing operation. The following operations are repeated at a predetermined cycle.

In step S701, the knock sensor signal is monitored and theflow proceed to step S702. The blowout caused by malfunctions of pins 57b and the release pins 57b are detected in the above monitoring process. In step S702, it is determined based on the monitoring results in step S701 whether an anomaly of the variable valve timing mechanism VT is generated. When the determination is "YES", the flow proceeds to step S706. When the determination is "NO", the flow proceeds to step S703.

In step S706, it is determined whether all (three) cylinders are anomalous. If the determination is "YES", the flow proceeds to step S707, wherein the fuel supply to all cylinders are cut and the aforementioned processing is repeated. When the determination in step S706 is "NO", the flow proceeds to step S708, wherein the fuel supply is cut for a cylinder, which is detected as anomalous, and the aforementioned processing is repeated.

In step S703, the POIL sensor signal is monitored and the flow proceeds to step S704. It is possible to determine in S703 whether the pressure states of the cylinder pause side passage 72 and the cylinder pause release side passage 73 are normal. Next, in step S704, it is determined based on the monitoring results whether the spool valve 71 is normal. When the determination is "YES", the flow proceeds to step S707. If the determination in step S704 is "NO", the flow proceeds to step S705 and the above processing is repeated.

Accordingly, in the second embodiment, similarly to the first embodiment, since the pumping loss of the engine and the friction of the valve gear system can be reduced extensively, it is possible to sharply improve the fuel consumption efficiency by increasing the regeneration amount without causing a large efficiency reduction of te ower transmission system. In addition, the assisting frequency and the assisting amount by the motor can be increased to the amount of regeneration energy obtained in the all-cylinder paused driving.

Furthermore, since the engine of the present embodiment comprises one cylinder among four cylinders is a regular cylinder which does not execute the cylinder pausing operation, it is possible to preserve at least a minimum amount of driving force when the variable valve timing mechanism VT becomes anomalous, and to contribute increasing safety of the vehicle.

Furthermore, since it is possible to cut the fuel supply to all cylinders capable of executing the cylinder pausing operation when the spool valve 71 or the variable valve timing mechanisms VT for all cylinders are anomalous; and since it is possible to cut the fuel supply for a part of cylinders among cylinders capable of executing the cylinder pausing operation when a part of the variable valve timing mechanisms VT becomes anomalous, not only the fuel consumption efficiency can be improved but also the catalyst can be protected by preventing the combustion of the fuel in downstream of the combustion chamber when the cylinders are recovered from the anomalous state.

In addition, since the spool valve 71 is disposed at a position, which is the outermost position from the regular cylinder, the cylinders provided with the hydraulic-type variable valve timing mechanisms VT can be disposed where the response to the oil pressure is high, which minimizes the operational delay of the variable valve timing mechanisms and recovers the response speed.

The present invention is not limited to the above-described embodiments, and the cylinder pausing operation may be executed by a variety of parameters such as the remaining battery charge, the battery temperature, the engine water temperature, the brake switch S4 which indicates the driver's will to decelerate the vehicle, the brake oil pressure, the brake depressing force, and a slip signal of the ABS system.

In the above embodiments, an explanation is provided in the case that the cylinder pausing operation is executed while both air intake valve and the exhaust valve for each cylinder are closed. However, it is possible to execute the cylinder pausing operation while only the air intake valves are closed or while only the exhaust valves are closed. The above operation enables to simplify the structure of the cylinder system. When the cylinder pausing operation is executed while the air intake valve of each cylinder is closed, the temperature drop in the combustion camber can be minimized because no fresh air is introduced into the combustion chamber. In contrast, when the cylinder pause is executed while only the exhaust valve of each cylinder is closed, the reduction of the catalyst performance can be minimized, since fresh air is supplied to the catalyst located downstream of the exhaust passage. In addition, the variable valve timing mechanism not only performs opening and closing of the air intake and exhaust valves of the cylinder, but also linearly controls the lift amount, so that it I possible to control the target amount of recovery energy and to control the amount of regeneration.

The number of cylinders, which can be used for the cylinder pausing operation, is not limited but more than one is preferable.

What is claimed is:

1. A control device for a hybrid vehicle having an engine and a single motor as driving sources and a power storage unit for supplying power to a single motor to drive the motor for assisting engine output when the vehicle is accelerating and receiving power generated by the single motor by regenerative braking when the vehicle is decelerating,
   wherein the engine is a cylinder pause-type engine and is capable of switching between all-cylinder driving operation, in which all of the cylinders of the engine are normally operating for outputting an engine output and a cylinder pause driving operation, in which at least one cylinder is paused by fully closing both intake and exhaust valves of each cylinder while cutting fuel supply to the engine,
   the control device of the hybrid vehicle comprising:
   a cylinder pause operation determination device for determining whether to switch the engine from the all-cylinder driving operation to the cylinder pause driving operation in response to the driving state of the vehicle;
   a fuel cut executing device for executing fuel cut before entering into the cylinder pause driving operation;
   a cylinder pause driving operation executing device for executing the cylinder pause driving operation by closing both intake valve and exhaust valve by a hydraulic-type variable timing mechanism after fuel cut has been executed; and
   a regeneration amount incresing device for incresing the regeneration energy for changing the power storage device by adding to the generation energy of recovered energy obtained when the cylinders of the engine are driving by the cylinder pause driving operation in place of the all-cylinder driving operation when the cylinder pause operation is determined by said cylinder pause operation determination device.

2. A control device for a hybrid vehicle according to claim 1, wherein said cylinder pause driving operation determining device determines for the engine not to enter into the cylinder pause driving operation when a negative pressure of a brake master cylinder is in a pressure range near atmospheric pressure and is above a predetermined threshold valve.

3. A control device for a hybrid vehicle according to claim 1, wherein the cylinder pause driving operation is carried out by closing both of the air intake valve and the exhaust valve of each cylinder.

4. A control device for a hybrid vehicle according to claim 1, wherein the cylinder pause operation executed by said cylinder driving operation execution device is to pause all cylinders.

5. A control device for a hybrid vehicle according to claim 1, wherein the number of cylinders which enter in the cylinder pause driving operation is more than one-half of all cylinders.

6. A control device for a hybrid vehicle according to claim 1, wherein the cylinder pause driving operation is performed by closing both air intake valve and the exhaust valve of each cylinder by each hydraulic-type variable valve timing mechanism, and the oil pressure control device for supplying an oil pressure to said variable valve timing mechanism is disposed at a position which is the outermost position from a cylinder not executing the cylinder pausing operation.

7. A control device for a hybrid vehicle according to claim 1, wherein said cylinder pause operation is carried out by closing one of the air intake valve and the exhaust valve of each cylinder.

8. A control device for a hybrid vehicle according to claim 1, wherein when an anomalous state is detected in at least one of said oil control devices or said variable valve timing mechanisms, said control device stops fuel supply for cylinders connected to the anomalous oil control device or the anomalous variable valve timing mechanism.

9. A method for controlling a hybrid vehicle, the hybrid vehicle comprising an engine and a single motor as driving sources and a power storage unit for supplying power to the single motor to drive the motor for assisting engine output when the vehicle is accelerating and receiving power generated by the single motor by regenerative braking when the vehicle is decelerating, wherein the engine is a cylinder-pause type engine and is capable of switching between all cylinder driving operation, in which all cylinders of the engine is normally operating for outputting an engine output and a cylinder pause driving operation, in which at least one cylinder is paused by fully closing both intake and exhaust valves of each cylinder while cutting fuel supply to the engine, the method comprising the steps of:

cutting fuel supply to the engine when the cylinder is paused based on the driving conditions of the vehicle;

carrying out a cylinder pause driving operation by closing both of the intake valve and the exhaust valve by actuating the variable valve timing mechanism;

increasing a regeneration power by power recovered when the engine is in the cylinder pause driving operation in place of the all-cylinder driving operation to the regeneration power obtained by the regeneration braking of the motor; and charging the power storage unit by use of the increased regeneration energy.

* * * * *

UNITED STATES PATENT AND TRADEMARK OFFICE
CERTIFICATE OF CORRECTION

PATENT NO. : 6,953,021 B2
DATED : October 11, 2005
INVENTOR(S) : Wakashiro et al.

It is certified that error appears in the above-identified patent and that said Letters Patent is hereby corrected as shown below:

Title page,
Item [30], Foreign Application Priority Data, insert:
-- October 23, 2000    (JP) …………....2000-323365
   May 24, 2001       (JP) …………....2001-155687 --.

Signed and Sealed this

Twenty-seventh Day of December, 2005

JON W. DUDAS
*Director of the United States Patent and Trademark Office*